US012801434B2

(12) United States Patent
Milojicic et al.

(10) Patent No.: US 12,801,434 B2
(45) **Date of Patent: *Nov. 17, 2026**

(54) OPTIMAL DISPATCHING OF FUNCTION-AS-A-SERVICE IN HETEROGENEOUS ACCELERATOR ENVIRONMENTS

(71) Applicant: Hewlett Packard Enterprise Development LP, Spring, TX (US)

(72) Inventors: Dejan S. Milojicic, Palo Alto, CA (US); Kimberly Keeton, San Francisco, CA (US); Paolo Faraboschi, Sant Cugat (ES); Cullen E. Bash, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 269 days.

This patent is subject to a terminal disclaimer.

(21) Appl. No.: 18/816,471

(22) Filed: Aug. 27, 2024

(65) Prior Publication Data

US 2024/0419490 A1 Dec. 19, 2024

Related U.S. Application Data

(63) Continuation of application No. 18/476,690, filed on Sep. 28, 2023, now Pat. No. 12,093,730, which is a continuation of application No. 17/198,871, filed on Mar. 11, 2021, now Pat. No. 11,809,218.

(51) Int. Cl.

*G06F 9/48* (2006.01)
*G06F 9/50* (2006.01)

(52) U.S. Cl.

CPC .......... *G06F 9/4881* (2013.01); *G06F 9/5005* (2013.01); *G06F 9/5044* (2013.01); *G06F 9/505* (2013.01); *G06F 9/5055* (2013.01)

(58) Field of Classification Search

None

See application file for complete search history.

(56) References Cited

U.S. PATENT DOCUMENTS

2002/0083244 A1* 6/2002 Hammarlund ...... G06F 12/0857 711/E12.05

2018/0254998 A1 9/2018 Cello et al.

(Continued)

OTHER PUBLICATIONS

Apache, "Apache OpenWhisk is a serverless, open source cloud platform", available online at <https://openwhisk.apache.org/>, 2016, 5 pages.

(Continued)

*Primary Examiner* — Qing Yuan Wu

(74) *Attorney, Agent, or Firm* — Hewlett Packard Enterprise Patent Department

(57) ABSTRACT

Systems and methods are provided for incorporating an optimized dispatcher with an FaaS infrastructure to permit and restrict access to resources. For example, the dispatcher may assign requests to "warm" resources and initiate a fault process if the resource is overloaded or a cache-miss is identified (e.g., by restarting or rebooting the resource). The warm instances or accelerators associated with the allocation size that are identified may be commensurate to the demand and help dynamically route requests to faster accelerators.

20 Claims, 13 Drawing Sheets

(56) References Cited

U.S. PATENT DOCUMENTS

| | | | |
|---|---|---|---|
| 2020/0220924 | A1 | 7/2020 | Yang et al. |
| 2020/0225983 | A1 | 7/2020 | Jung et al. |

OTHER PUBLICATIONS

Baresi et al., "Towards a Serverless Platform for Edge Computing", May 2019, 2019 IEEE International Conference on Fog Computing (ICFC). (Year: 2019).

Boza, E.F, "Towards Improved Cloud Function Scheduling in Function-as-a-Service Platforms," EuroDW18, Apr. 23, 2018, 2 pgs., http://conferences.infed.acuk/EuroDW2018/papers/eurodw18-Boza.pdf, Porto, Portugal.

Chhatrapati, S et al., "Predictive Scheduling for Functions-as-a-Service," CS262a, Fall 2019, 10 pgs., https://people.eecs.berkeley.edu/~kubitron/courses/cs262a-F19/projects/reports/ project16 report ver2.pdf, UC Berkeley.

Choi et al., "Lambda-NIC: Interactive Serverless Compute on Programmable SmartNICs", Sep. 26, 2019, 15 pages.

CMU, "Parallel Data Lab Project: Cloud Scheduling (TetriSched)", available online at <https://www.pdl.cmu.edu/TetriSched/index.shtml>, 2021, 4 pages.

Google Cloud, "System Architecture", available online at <https://web.archive.org/web/20201029024831/https://cloud.google.com/tpu/docs/system-architecture>, Oct. 29, 2020, 8 pages.

Knative, "Knative Features", available online at <https://knative.dev/>, 2021, 2 pages.

OpenFaaS, "Introducing OpenFaaS for AWS Lambda (faas-lambda) | OpenFaaS—Serverless Functions Made Simple", available online at <https://web.archive.org/web/20201108000414/https://www.openfaas.com/blog/introducing-openfaas-for-lambda/>, Jun. 13, 2019, 13 pages.

Singhvi, A. et al., "Archipelago: A Scalable Low-Latency Serverless Platform," Nov. 22, 2019, 14 pgs., https://arxiv.org/pdf/1911.09849.pdf.

* cited by examiner

OPTIMAL DISPATCHING OF FUNCTION-AS-A-SERVICE IN HETEROGENEOUS ACCELERATOR ENVIRONMENTS

CROSS-REFERENCE TO RELATED APPLICATIONS

This application is a continuation application of and claims priority to U.S. application Ser. No. 18/476,690, filed on Sep. 28, 2023, which is a continuation application of and claims priority to U.S. application Ser. No. 17/198,871, filed on Mar. 11, 2021, the contents of which are hereby incorporated by reference in their entireties.

DESCRIPTION OF RELATED ART

In cloud computing, portions of a computing environment can be offered as a service to provide interface points for users to the environment, including Hardware as a Service (HaaS) and Software as a Service (SaaS). With the cloud computing environment configured to meet varying demand by users accessing these services, the environment becomes exceedingly complex and unruly to manage. Better methods of implementing services in cloud computing are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
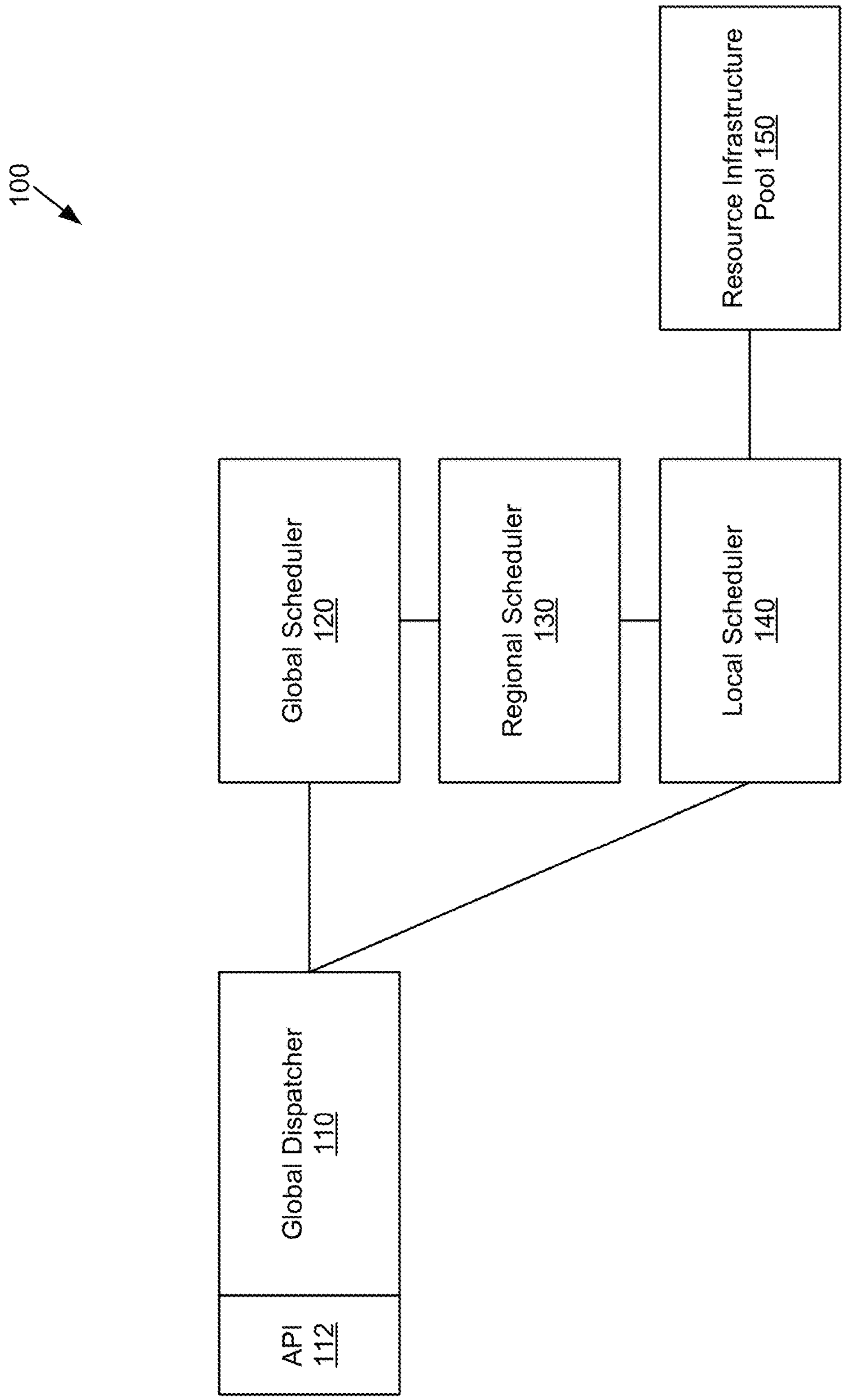
FIG. 1 provides an illustrative portion of an Function as a Service (FaaS) system, in accordance with embodiments of the application.

The figures are not exhaustive and do not limit the present disclosure to the precise form disclosed.

DETAILED DESCRIPTION

Cloud environments are implemented using datacenters that are often accessed through application programming interfaces (APIs) by users who want to use the hardware and software of the datacenter as a service. Datacenters leverage a heterogeneous collection of machines with different capabilities (e.g., memory capacity, accelerator, CPU, GPU) to execute a heterogeneous collection of workloads (e.g., stateless function calls, long-running services, batch data analytics, interactive development and testing, etc.) to implement the services on behalf of the users. These workloads can enable each of the services, for example, by assigning the workloads to computing resources in the datacenter by a resource scheduler. To maximize resource efficiency and utilization, these machines may be aggregated into an infrastructure or resource pool where workloads are consolidated. In this example, the resource scheduler may be tasked with assigning infrastructure components to workloads.

One type of service offering in a cloud computing environment is an function-as-a-service (FaaS). FaaS computing models allow users to access FaaS infrastructure (e.g., datacenter, servers, racks, nodes, etc.) through the use of function calls to the FaaS infrastructure. These functions may be uploaded to a service layer of the FaaS infrastructure, and may be independently scheduled and executed on computing devices of the FaaS infrastructure. For example, a user may access the FaaS infrastructure by submitting a function call to an application programming interface (API) or transmitting an HTTPS request which is operated by the resource scheduler.

There may be a cost associated with operating and providing use to the FaaS infrastructure. In some examples, an entity that operates the physical and virtual machines of the FaaS infrastructure may charge a user to access these infrastructure resources. How much the entity is charged may depend on how the infrastructure is used. For example, in one instance an entity may be charged a lower cost for execution of a function than for a container structure. As another example, an entity may be charged a larger amount for use of a virtual machine (VM) or physical cluster than for a container (e.g., based on a type of resource distribution, based on a type of accelerator used, based on having additional resources reserved for the entity's use in a sleep or active state, based on an amortization cost or power consumed, etc.). These costs are often irrelevant to the quality of service (QOS) provided by the FaaS infrastructure.

In some examples, an entity may request access to a function using an FaaS invocation, but may not specify the underlying infrastructure used to carry out that function. The use of these types of function requests to the FaaS infrastructure may be improved by incorporating specialized accelerators in the datacenter of the cloud computing environment that are optimized for specific workloads (e.g., rather than a general-purpose microprocessor, etc.). The specialized accelerators may be specialized hardware, or a combination of hardware and/or software/firmware that is uniquely configured to process specific workload types more efficiently. These accelerators may, in some examples, incorporate machine learning processes (e.g., Deep Neural Networks, various High-Performance Computing (HPC) applications, etc.) or other functionality to improve operation and use of the FaaS infrastructure. While incorporation of accelerators into a workflow may increase performance and overall system efficiency, it may lead to a more heterogeneous system. In some examples, the heterogeneity of a system may result in more complex management of the underlying infrastructure. Complex management of infrastructure may lead to an increase in under-utilization or over-utilization of resources. The complexities can often lead to system-wide or cluster-wide inefficiencies.

With the increasing adoption of Function as a Service (FaaS), optimizing deployment and execution of the functions on heterogeneous hardware, including accelerators, could have technical benefits throughout the computing environment. As described above, systems are becoming increasingly heterogeneous, and may include a variety of different processing elements, such as CPUs, GPUs, FPGAs and ASIC accelerators, etc. There could be many function requests for a constrained set of resources, causing resources to share space and processing time. With greater sharing of resources, the scheduler incorporated with the FaaS infrastructure may prioritize some function requests over others, based on a stored set of rules and priorities associated with the entity sending the request. In some examples, other function requests may be preempted or evicted if newer or preferable requests arrive (e.g., based on a ranking system of incoming requests, costs, users, etc.).

To be able to deploy and execute FaaS capabilities in a cost-effective, optimal manner (e.g., in terms of cost to execute the functions and hardware of the system and financial gain derived by execution vs. guaranteed performance), a system including a dispatcher, scheduler, and resource infrastructure may be implemented. Each of these may be considered computing nodes or devices. These computing nodes or devices may dynamically work quickly with the FaaS infrastructure. This may include, for example, caching functions (e.g., "warm" functions) based on metrics other than the priority associated with the requesting entity. For example, the FaaS infrastructure may offer more or fewer functions as services to users, at least in part by caching functions. Function caching can allow the FaaS infrastructure to cache the return values of the function depending on the arguments, thereby saving processing time to complete the request when the function is called with the same arguments, since the return values are already stored. The types of functions that may be cached may be based on various factors, for example, the system may cache functions that are the most frequently used, or may remove functions that are costly to cache (e.g., based on a resource that is used to process the function and a cost associated with using the resource for a predetermined amount of time, bandwidth, etc.) or are rarely used, etc. The dispatcher may be configured to deploy and invoke FaaS efficiently, while the scheduler may be configured to prioritize the quality of service (QoS) classes of requests. The dispatcher, scheduler, and algorithms may be implemented on the heterogeneous environment comprised of multiple accelerators to improve processing of the FaaS requests.

Embodiments described herein can incorporate an optimized dispatcher computing device. The dispatcher may manage calls to an FaaS infrastructure to permit and/or restrict access to resources with a minimal number of hops (e.g., a number of intermediate connections in a string of connections that link the global dispatcher, scheduler, and/or resource, or that link two resources when processing is moved from one resource to another). The minimal number of hops may be defined based on various metrics. For example, a minimal number of hops may include a lowest number of infrastructure resources visited in a communication path (e.g., A to B or A to C). In another example, the minimal number of hops may include a shortest amount of time between two infrastructure resources (e.g., A to B to C is 5 milliseconds whereas A directly to C is 7 milliseconds).

In some embodiments, the dispatcher computing device can assign requests to "warm" resources, i.e., resources that may implement a deployed function with code and any resources the system may use for implementing the functionality at the given accelerator, where the resource is previously loaded with the cached or "warm" function. An accelerator may be identified as "warm" when the accelerator is used within a predetermined time period and is deployed within the FaaS infrastructure. The dispatcher computing device may, in some examples, assign the requests to warm resources based on a minimal number of hops to the resource, and initiate a fault process if the resource is overloaded or a cache-miss is identified (e.g., by restarting or rebooting the resource, or by redistributing functions to other resources based on load balancing metrics, etc.). Assigning the requests to warm resources and initiating the fault process may also help identify and increase the number of warm instances or "allocation size" (e.g., an "allocation size" may correspond to the number of accelerators with warm copies in its memory that is pre-provisioned at one time). The identified warm instances or accelerators associated with the allocation size may be commensurate to demand of these resources in implementing the overall functionality of the FaaS infrastructure. For example, the system may dynamically route requests to particular accelerators best suited for efficient processing of the particular request. The warm copies stored in memory can be associated individually with each accelerator or could be shared across accelerators. The infrastructure layout that implements pre-provisioned, warm copies in memory for the accelerators may be predefined by a system administrator or requested on an ad hoc basis by individual users.

The warm accelerator may be cached in a local memory and may correspond with a function ID that points to the end of the memory queue. If an accelerator is not available (e.g., due to tail latency or a request surge), a different accelerator may be identified by initiating a search of the memory queue. If no accelerator is found, a new accelerator may be identified, assigned to execute the function, and associated with the allocation size. When the updated allocation size exceeds a predetermined value (e.g., threshold), the allocation size may be increased. In some examples, the allocation size may be adjusted dynamically to include the new accelerator.

Embodiments described herein may incorporate one or more scheduler computing devices to schedule functions in the FaaS infrastructure. The scheduler may identify infrastructure resources using prediction-based scheduling based on, for example, a user tier, profit, revenue, and cost. In some examples, the scheduler may help identify infrastructure resources based on demand. The scheduling of the FaaS infrastructure may incorporate customer tiers to predict initial scheduling and determine subsequent scheduling.

A customer tier may correspond with a determined ranking of a user. The user may be ranked using various metrics, including an amount of use of the FaaS infrastructure (e.g., data used, speed of processing, amount of data storage, breadth of functionality available, amount paid for services, profit earned by the system, etc.). The customer tier may be stored in a user profile.

Each customer tier may be dynamically adjusted (e.g., by the system, etc.) based on relative and/or absolute threshold values. For example, when a user has requested a threshold number of functions (e.g., fifty functions, etc.), the customer tier may be increased from an infrequent tier to a moderate tier. In another example, when a first set of users have provided X-amount of profit while a second set of users have provided a lower, Y-amount of profit, the customer tiers associated with the second set of users may be decreased.

In some examples, the FaaS infrastructure may be allocated based on the customer tiers. Allocation of resources from the FaaS infrastructure may correspond to the customer tiers (e.g., high system use corresponds to greater fees/revenue paid by the user, etc.) to maximize revenue in view of cost of the overall system. As a sample illustration, the user that has requested a threshold number of functions (e.g., fifty functions, etc.) and associated with a moderate tier may be assigned more resources from the FaaS infrastructure to execute their functions than a user that has requested fewer than a threshold number of functions and assigned a lower tier. This may result in faster and more efficient processing.

In some examples, one or more portions of the FaaS infrastructure may be redeployed in case of failure. In some examples, one or more portions of the FaaS infrastructure may be redeployed for being overloaded with scheduled and active function calls. Either of the values of scheduled or active function calls may help redeploy functionality using customer tiers, adjust a customer tier based on one or more thresholds, or implement additional resource pools (e.g., corresponding to revenue tiers, etc.).

An example scheduling process may include performing an initial multi-criteria lookup to help determine the correct allocation size, accelerator type and number, and the like. Using the initial multi-criteria lookup, a search of available resource nodes may be performed by the optimized dispatcher computing device to identify a subset of resources that match the initial criteria. The criteria may include several attributes of the user and/or features of the FaaS infrastructure. Example attributes of a user may include a class of user (e.g., based on reputation or relative ranking, including top class, middle class, bottom class), payment history, revenue projected (e.g., high, middle, low), and the like. Example features of FaaS infrastructure may include availability of resources (e.g., fast, medium, slow), availability of QoS classes (e.g., based on isolation and guarantees secured: 0, 1, 2, etc.), and the like. Isolation may correspond with restricting functions from calling other functions, creating an isolation of functions at the determined resource. Guarantees may correspond with a minimum level of performance (throughput, efficiency, integrity, etc.) of the system when executing functions. Other search criteria may be used as well, including a particular resource type, whether a price for utilizing the resource node is within a predetermined range of prices, whether the resource node includes a "warm" copy of a function (e.g., cached function, etc.), and the like.

In some examples, complex scheduling operations may be performed by the global scheduler with the global dispatcher performing simpler lookups and dispatching requests. If the global dispatcher cannot identify where to dispatch the execution of the function to a particular accelerator, it may refer to global or regional schedulers to perform the scheduling.

Illustrative examples of executing a function based on a received request are provided throughout. For example, if the search identifies a resource node in a subset of resources that matches a set of given criteria, the global scheduler may allocate the request to execute the function to the identified resource node. This assignment of the execution of the function to the identified resource node can help select an available resource by the global scheduler. If a requested resource type in the subset of resources is not available, the global scheduler may allocate the request to a different resource node outside the subset of resources that does not fully match the search criteria, for example, by upgrading the resource type criterion to a faster resource type. In another example, if the price is not within acceptable class, the global scheduler may upgrade to a criterion to a different class of resources. If a warm instance is not cached on any resource nodes listed in the subset of resources, the global scheduler may submit a request to find a different resource node with a warm instance via a regional scheduler or local scheduler, as described herein. If the cost is not minimized, the global scheduler may attempt to downgrade to a lower resource class or resource type. In each of these cases, the selection of the resource node for execution of the function may seek to maximize (upgrade) or minimize (downgrade) certain criteria, including processing efficiency, throughput, cost, profit, QoS, and other metrics described throughout the disclosure.

In these and other examples, allocation may be considered by the system based on a fluctuating cost and classes of each resource node. For example, a resource node associated with a higher cost may be assigned to perform processing associated with a first function call (e.g., because a lower cost resource is not available). During the processing, a lower cost resource may become available and the system may determine the tradeoff of switching the processing to the lower cost resource or keeping the processing at the higher cost resource. For example, this lower cost resource may perform the processing within a QoS, at more of a delay, but within the price paid, causing the determination by the system to be limited to QoS versus profit. The system may prioritize, for example, reducing any processing delays over price/profit. Any new requests corresponding with the same cost (e.g., from the same customer, customer tier, etc.) may be redirected to the lower cost resource and the existing processing may remain at the higher cost resource. In some examples, the higher cost resources could be available for new requests or assigned to other requests so that assigning requests to lower cost resources frees up the higher cost resources to be assigned to new requests. Using this reallocation based on the cost criterion of the received requests, the overall cost can be minimized for the system and the resources can efficiently process the function calls.

In some examples, the FaaS infrastructure may consider "tail latency," "ramp-up tail latency," and "accelerated ramp-up tail latency" of the resource when selecting a resource for implementation of a function. In each of these instances, a subset of longest response times of the resource (e.g., 10%, 20%, etc.) may be compared with an average response time of the resource (e.g., 100%, etc.). This comparison can identify outliers for resources that respond to requests and assess the usability of the resource node.

"Tail latency" may correspond to a percentage of response times of the resource, out of all of responses for the resource that take the longest, in comparison to most of its response times. Tail latency may be caused by factors, such as interference on network, interconnect, CPU, memory, operating system (OS), application, etc. Tail latency may also be caused by various scheduling and dispatching delays.

In some embodiments, the system may reduce tail latency. For example, a global scheduler may move the processing corresponding with a request from a first resource node to a second resource node. The second resource node may be a higher-class resource with higher QoS guarantees and/or faster processing. Using this higher-class resource, the tail latency value may be reduced for the request, when comparing processing of the request between the first resource node and the second resource node.

In some embodiments, tail latency may correspond with a latency calculation for a class of requests. For example, the tail latency may correspond with values at the tail end of all latencies, or the longest latencies, when the latencies are ordered by the class of requests. As an illustrative example, 99% of all requests in a particular class of requests could be within QoS guaranteed latency of 10 us (microseconds), but 1% of the requests in the class could be have latencies of 10 us to 20 us. The 1% can be considered as tail latency for the class of requests.

"Ramp-up tail latency" may refer to tail latency in the presence of ramp-up in warm copies, such that the subset of longest response times for the resource are compared to an average response time of the resource, only when assessing "warm" copies. Ramp-up tail latency may be determined to help identify when to add warm instances or allocations to the resources. For example, to reduce the ramp-up tail latency value, the global scheduler may add more warm copies to the resources when it determines that the warm copies are close to being exhausted.

Accelerated ramp-up tail latency may refer to ramp-up tail latency where allocation is increased (accelerated). Increasing the number of warm copies may be triggered when the available resources to ramp use is less than a predetermined minimal value. Similar to ramp-up tail latency, accelerated ramp-up may identify a pattern of exhausting warm copies. If the warm copies are exhausted at a quicker rate than a threshold value, the global scheduler may increase the number of warm copies available for the next request (e.g. by doubling the requested resources or indexing more resources, etc.). This comparison may indicate that there is a need to accelerate ramp-up to avoid additional latency. In some examples, accelerated ramp-up tail latency corresponds to adding increasingly more (e.g., accelerating) allocations until supply catches up with demand. This may be implemented when demand for resources exceeds supply (e.g., more than a threshold value and in less than a threshold time).

Embodiments described herein may also incorporate FaaS market-driven pricing across all users. Factors that help determine pricing may include quality of service (QOS) delivered on tail latency for reserved resources, a ramp up time period required for non-reserved resources, and/or a speed of the ramp-up. The speed of the ramp-up may be based on the ability to expand and contract the number of resource nodes, and the rate at which the number of resource nodes is expanded and contracted for a sudden increase number of requests above a threshold value (e.g., a surge in requests for use of accelerators in the system, etc.). These dynamic configurations of the network may be considered elasticity (e.g., adjusting a single resource node) and meta-elasticity (e.g., adjusting thousands of resource nodes, or some other plurality, etc.). In some examples, the pricing may correspond with a default option (e.g., a consolidation of accelerators used to perform the execution of the function in order to optimize cost) or a preferred distribution option (e.g., selecting accelerators based on co-location of the accelerators to each other, or stride scheduling or stride group selected based on a proportional-share control over accelerator time by cross-applying elements of rate-based flow control algorithms). In some examples, the pricing may correspond to an accelerator type and/or corresponding memory-size of a computing device. In some examples, cost for accessing the FaaS infrastructure may be dynamic, in part to quickly increase a number of warm copies of a deployed FaaS on a plurality of accelerators. This dynamic cost may help determine pricing that covers delivering QoS on tail latency for FaaS execution, ramp-up of resources, and the speed of ramp-up, as well as determining a preferred distribution.

Technical advantages are realized throughout the application. For example, the computational efficiency of accessing FaaS infrastructure using the optimized dispatcher and/or scheduler may be increased, at least in part due to the configuration of the dispatcher and/or scheduler to manage calls to the FaaS infrastructure that permits and restricts access to resources with a minimal number of hops. Additionally, the dispatcher and/or scheduler may quickly access resources by assigning requests with a minimal number of hops and initiating a fault process if the resource node is overloaded or a cache-miss is identified.

FIG. 1 provides an illustrative portion of an Function as a Service (FaaS) system, in accordance with embodiments of the application. In illustration 100, global dispatcher 110, global scheduler 120, regional scheduler 130, local scheduler 140, and resource infrastructure pool 150 are provided. Global dispatcher 110 may be incorporated with API gateway 112.

Although a single global scheduler 120, regional scheduler 130, local scheduler 140, and resource infrastructure pool 150 are illustrated, a plurality of each computing device may be incorporated in an illustrative implementation of the FaaS system. For example, the system can implement multiple global, regional, or local scheduler instances organized in a distributed fashion (e.g., for fault tolerance and load balancing purposes, etc.). In some examples, more than three distinct levels of schedulers may be implemented (e.g., global, national, time-zone region, state-wide, city-wide, etc.). In other examples, fewer than three distinct levels of schedulers may be implemented (e.g., combined regional and local scheduler, etc.). These and other iterations of the plurality of each computing device may be implemented without diverting from the essence of the disclosure.

API gateway 112 may be configured to receive and route an incoming request (e.g., from a user device, etc.) for executing a function as a service. For example, when API gateway 112 receives the request, it may identify a routing configuration matching the request and call the relevant FaaS function with a representation of the original request. API gateway 112 may be an HTTP server where routes and endpoints are defined in configuration, and each route is associated with a resource to handle that route.

The incoming request may correspond to a request to execute an function as a service (FaaS) in the FaaS infrastructure. The request may comprise or include (used interchangeably throughout to be inclusive or open-ended and not exclude additional, unrecited elements or method steps, etc.) a function identifier (function ID) and one or more parameters. The parameters may include a function code, metadata, function ID, and/or parameters. The code can be specific to one execution platform or it can be generic, so that the function code can be deployed to any of the accelerators. In some examples, the FaaS infrastructure may translate the code received in the request to a different format that complies with the particular FaaS infrastructure.

In some examples, the incoming request may be accompanied by a number of codes to be executed on a number of resource nodes. This may include, for example, Central Processing Unit (CPU) specific function code, CPU specific metadata, Graphics Processing Unit (GPU) specific function code, GPU specific metadata, Field-Programmable Gate Array (FPGA) specific function code, FPGA specific metadata, accelerator specific function code, accelerator specific metadata, and the like. Any of these device specific codes or metadata may be accompanied by the function ID and parameters as well.

API gateway 112 may route the request to global dispatcher 110. Each of the global dispatcher 110, global scheduler 120, regional scheduler 130, local scheduler 140, and resource infrastructure pool 150 illustrated in FIG. 1 may be implemented as a standalone computing device (e.g., processor, computer readable media, etc.), computing device incorporated in a shared system, or virtually implemented.

Global dispatcher 110 may dispatch execution of the function associated with the request to any accelerator/CPU in the system directly. Global dispatcher 110 may dispatch under the assumption that warm copy of the FaaS is already deployed, without engaging the schedulers. In some examples, a non-global dispatcher is responsible for a subset of resource infrastructure pool 150.

Global scheduler 120 may be a logically single scheduler that may be implemented in a single device or in a distributed fashion. Global scheduler 120 may be responsible for all resource pools. In some examples, global scheduler 120 may be responsible for a configurable number of regional schedulers (e.g., regional scheduler 130A, 130B, etc.), and may enable forwarding requests from one regional scheduler to another regional scheduler.

Regional scheduler 130 may be responsible for a configurable number of local schedulers, and may be mapped to, for example, multiple numbers of racks or to a data center. Regional scheduler 130 may serve the role of mapping requests from global to regional schedulers, or to enable forwarding requests from one local scheduler to another local scheduler.

Local scheduler 140 may be coupled to a hardware unit which could be configurable as a circuit or engine of the resource node (e.g., a device with many accelerators, etc.), an enclosure, or a rack of computing devices. Local scheduler 140 may be responsible assigning execution of the function associated with the request for the multiple pools that it manages. Local scheduler 140 may also be configured to not manage any other schedulers in a hierarchy, for example, based on global scheduler 120 and regional scheduler 130 performing these operations.

Resource infrastructure pool 150 may include various hardware or software components in the system, including accelerators, CPU/GPU, rack of computing devices, and the like.

Figure 2:
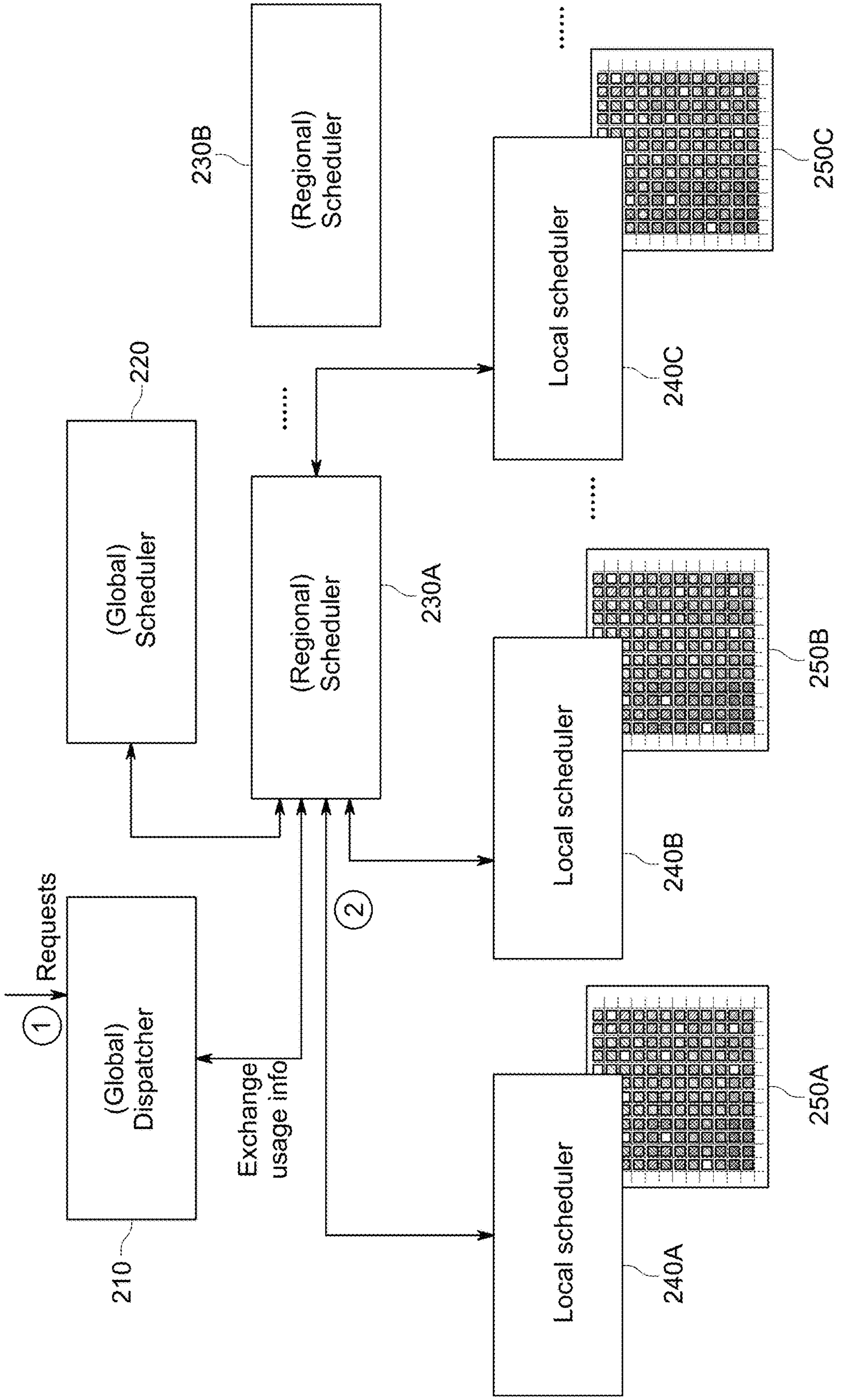
FIG. 2 provides an illustrative dispatcher and schedulers in the FaaS system, in accordance with embodiments of the application.
Figure 3:
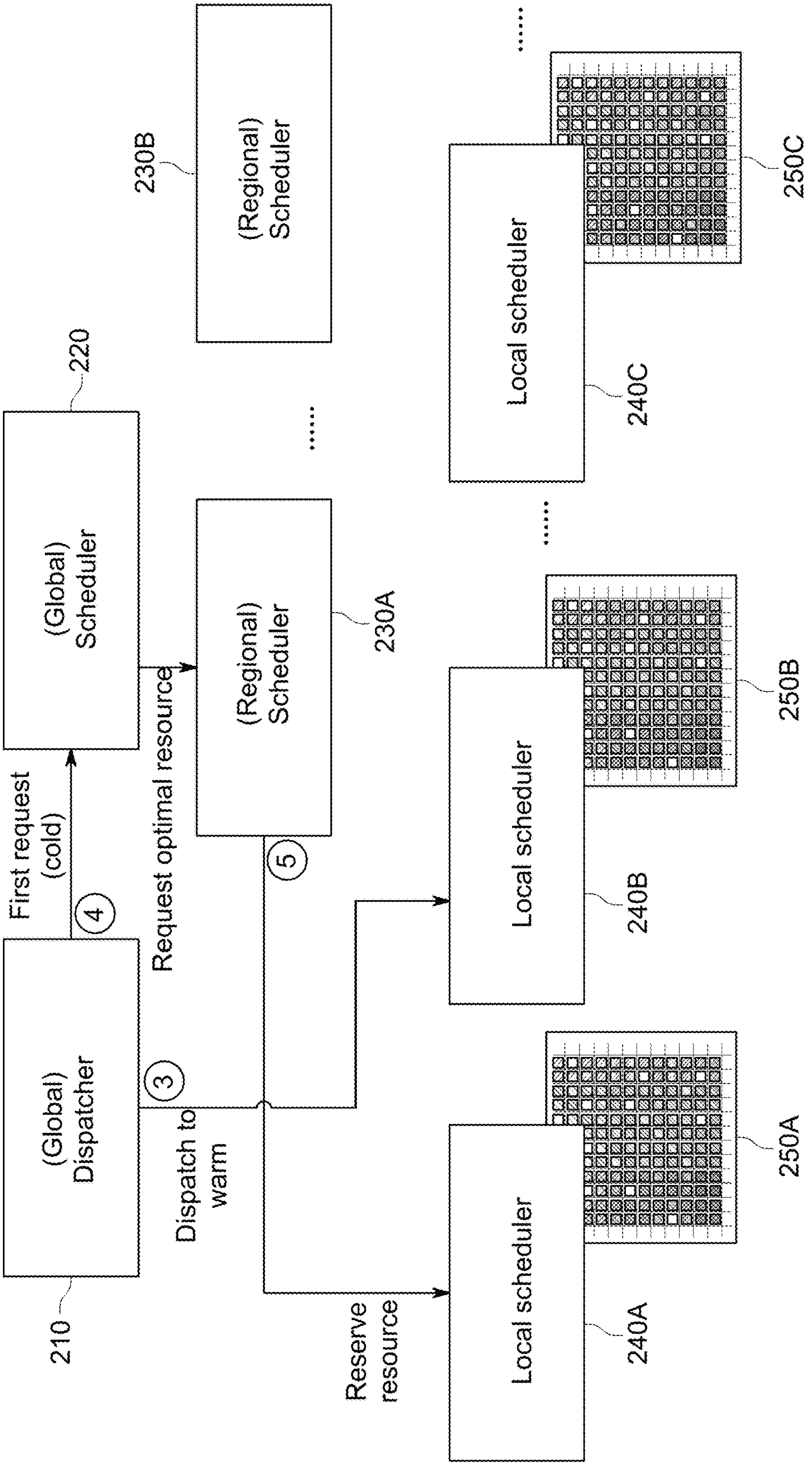
FIG. 3 provides an illustrative dispatcher and schedulers in the FaaS system, in accordance with embodiments of the application.
Figure 4:
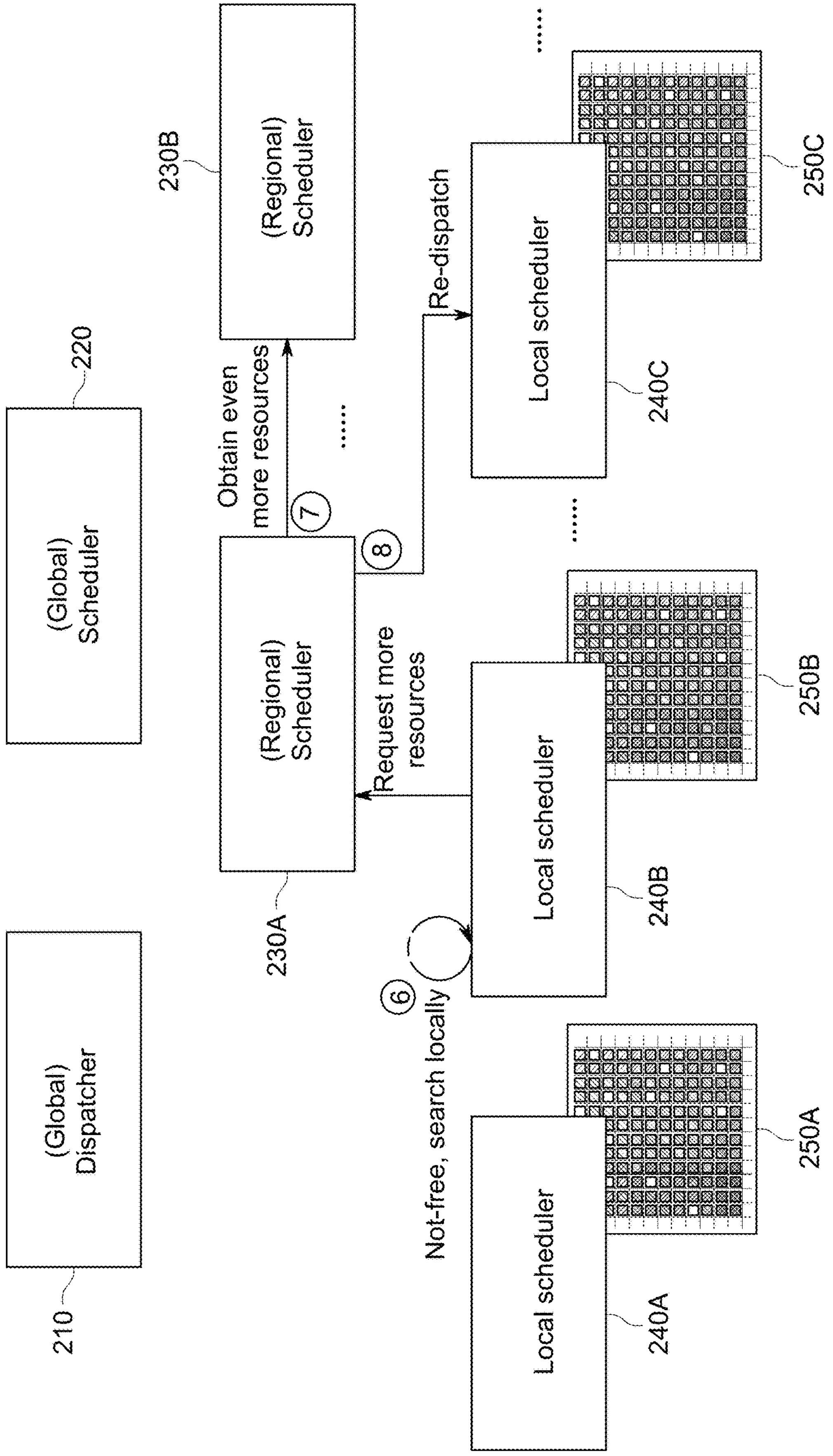
FIG. 4 provides an illustrative dispatcher and schedulers in the FaaS system, in accordance with embodiments of the application.

FIGS. 2-4 provides an illustrative dispatcher and schedulers in the FaaS system, in accordance with embodiments of the application. In FIGS. 2-4, global dispatcher 210 may execute a dispatching algorithm for dispatching an FaaS computing environment. Global dispatcher 210, global scheduler 220, regional scheduler 230, local scheduler 240, and resource infrastructure pool 250 may correspond with global dispatcher 110, global scheduler 120, regional scheduler 130, local scheduler 140, and resource infrastructure pool 150, respectively. A plurality of regional schedulers 230 (illustrated as first regional scheduler 230A and second regional scheduler 230B), a plurality of local schedulers 240 (illustrated as first local scheduler 240A, second local scheduler 240B, and third local scheduler 240C), and a plurality of resource infrastructure pools 250 (illustrated as first resource infrastructure pool 250A, second resource infrastructure pool 250B, and third resource infrastructure pool 250C) are provided for illustrative purposes. In some examples, there may be a one-to-one correspondence between each local scheduler 240 and each resource pool 250. Other implementations may include a one-to-many correspondence between local scheduler 240 and resource infrastructure pool 250, or a many-to-many correspondence.

At block 1, global dispatcher 210 may receive an incoming request for an FaaS. In some examples, global dispatcher 210 may use a smart network interface controller (Smart NIC) to analyze an incoming request inline (e.g., via API gateway 112), using a ternary content-addressable memory (TCAM) and/or accelerator dedicated to search. The smart NIC may assign accelerators to FaaS requests from a linked list data structure (e.g., class, type, etc.) or other similar data structure for a given type (e.g., different ISA, implementation, etc.). In some examples, the smart NIC may assign accelerators to the FaaS request based on QoS classes (e.g., the determined priority and bandwidth for traffic matching based on a QoS policy rule, etc.).

In some examples, global dispatcher 210 may identify an FaaS identifier with the request. At block 2 and based on the FaaS identifier, global dispatcher 210 may electronically communicate with global scheduler 220 and/or one or more regional schedulers 230, including first regional scheduler 230A. The communication may exchange usage information of one or more local schedulers 240 and corresponding resource infrastructure pools 250. Local schedulers 240 can return information associated with each corresponding resource of the resource infrastructure pools 250, including estimated timing of access (e.g., to programmatically determine whether the resource is warm or cold, etc.).

At block 3 of FIG. 3, using the exchanged usage information, global dispatcher 210 may identify any available warmed copy of the function (FaaS) at the particular resource 250 that matches the function identified in the request. The identified warm copies may include the least recently accessed warmed copy of the FaaS (e.g., as a proxy for the copy that is most likely to be free soon, etc.) or second least recently accessed, and so on. Accessing the least recently accessed warmed copy may correspond with an expectation that the warmed copy previously executed at the particular resource 250 and the particular resource 250 may soon be free for a new FaaS request. In some examples, the identified warm copies may include determining an oldest previous deployment of the function as the warmed copy. The least recently accessed warmed copy and/or the oldest previous deployment of the function may be identified in a list maintained by API gateway 112 and/or global dispatcher 210 on entry (e.g., the time that the request is received by the system). In some examples, the least recently accessed warmed copy may be identified by the expected availability time and/or through a search of one or more queues maintained by each device.

In some examples, the FaaS request may traverse a plurality of schedulers, including global scheduler 220, regional scheduler 230, and local scheduler 240, as illustrated in block 4 of FIG. 3. FIG. 3 may also include an illustration of the first request, requested optimal resource, and reserve resource. In some examples, information associated with each resource infrastructure pool 250 may be cached at any of these four levels (e.g., global dispatcher 210, global scheduler 220, regional scheduler 230, local scheduler 240).

Some embodiments may incorporate a key-value store (KVS) and send the received request to execute the function directly to the accelerator location. For example, an in-memory KVS may store the type of function associated with the request. The requestor may search the KVS for available accelerators. Upon completion, schedulers may store a list of available accelerators with warm copies. As illustrated in FIG. 4, this implementation may effectively require only one hop between global dispatcher 210 and a determined local scheduler 240 to access the corresponding resource 250. As illustrated, global dispatcher 210 may access second local scheduler 240B associated with second resource 250B of the resource infrastructure pool 250.

At block 5 of FIG. 3, regional scheduler 230A or local scheduler 240A can reserve resource 250A to execute the function. The resource 250A may be reserved by transmitting the FaaS identifier to the resource and updating the memory queue at regional scheduler 230A or local scheduler 240A.

Additional resources may be identified. For example, when the identified accelerator is not free, a search may be implemented on the local resource node to obtain or identify resources on a different free resource node of resource infrastructure pool 250, as illustrated at block 6 of FIG. 4. The search may include various corresponding memory queues, for example, searching a list of warm accelerators and function IDs that point to the end of the memory queue, or other information cached in a local memory. In some example, the queues may be adjusted on global dispatcher 210 and other nodes.

If another accelerator is not found locally, then a search may be implemented by a communication originating at first regional scheduler 230A and electronically sent or transmitted to other nodes, including second regional scheduler 230B, as illustrated at block 7.

If no accelerator is available in existing queues dedicated to a given FaaS identifier, then new warm copies may be added to the resource from second regional scheduler 230B, as illustrated at block 8. This may include copying the code for the previously warmed copy at another warmed resource to a new location at second regional scheduler 230B unless it can be accessed remotely at first regional scheduler 230A.

In some examples, the plurality of resources is accessed and tracked via a counter. The counter may be incremented for each FaaS identifier invocation. In some examples, the counter may be increased for each allocation increase (e.g., the number of accelerators with a warm copy in its memory that is pre-provisioned at one time). If the allocation is increased at less than a threshold rate (e.g., the increases are slow enough and/or many successive allocation increases occur in less than preconfigured time), then allocation size itself may be increased. Increasing the allocation size itself may correspond with elastic acceleration (e.g., the ability to quickly expand or decrease computer processing, memory, and storage resources to meet changing demands of the system), not just growth.

In some examples, the number of warm copies may directly influence cost for accessing the resources 250. The pricing and cost for accessing the FaaS infrastructure by the user may be proportional to the number of warm copies of the resource.

In some examples, invocations at a particular resource in the resource pool 250 may be calculated. For example, a QoS value may correspond with the lesser of tail latency (e.g., for execution, elasticity and meta-elasticity), distribution, and accelerator-type.

In some examples, an FaaS market-driven pricing (across all users/FaaS) may be calculated using a formula, where the prices is a function of the cost to deliver the QoS, distribution, and accelerator type:

$$\text{Price} = f(\text{distribution}) + g(\text{accelerator-type, consolidation}) + h(\text{desired-elasticity})$$

Execution time of each FaaS request may be calculated and tracked (e.g., the average execution time, the standard deviation execution time, etc.). An average execution time, standard deviation, and tail latency (e.g., outlier requests that take longer than predefined QoS guarantee, e.g. 20%, 30%, or 35%) may be determined for each of the FaaS requests. In some examples, an elastic acceleration (e.g., 15%, 22.5%, 25%) or meta-elastic acceleration (e.g., adding accelerated allocations at 10%, 15%, 20%) may be determined.

In the presence of elastic and meta-elastic dispatching/scheduling, the execution time may be calculated and tracked as well. The calculation of the estimated execution time may be triggered in various scenarios. For example, the calculation may be initiated for ramp-up of resources when all resources are currently in use. In some examples, the execution time may be calculated and tracked when an increase in additional resources is required.

In some examples, cost may vary based on the type of resource that is executing the requested function. The resources at one or all locations may be unable to provide the allocation or accelerated allocation. The distribution of these allocations may result in different costs, which can be determined by the system in determining which resource(s) to use. Cost may be derived based on the availability of additional reserved resources (e.g., in a sleep or active state for specified distribution, etc.). In some examples, cost may be proportional to amortization cost and power consumed. Distribution may affect the degrees of freedom of where resources are deployed and accelerator type results in different power consumption and has different amortization cost.

In another possible implementation, the pricing determination can be achieved by searching a heuristic table. The heuristic table may store aggregate numbers (e.g., of revenue, profit, etc.) associated with each user of the system, such that a search of the heuristic table may help estimate an overall revenue and profit associated with the user. In some examples, the heuristic table may be generated by an administrative user.

In yet another implementation, the pricing determination may be accomplished by a precise counting of invocations, QoS accomplished, cost for all executions, type of accelerators, memory sizes, etc. In some examples, these costs may be predetermined and stored in a data store or other lookup table, as further illustrated with FIG. 5, as described in further detail below.

In some examples, various request dependencies may be considered with performance and pricing, as illustrated in Table 1 provided herein. For example, performance of the system in response to a request may be dependent on various factors, as well as pricing that the user would pay for using the system to perform the request.

TABLE 1

| Performance & Price | Options: Execution-> Elastic-> Meta-elastic | QoS (commodity, medium, high guarantee) | If Preferred Distribution | Accelerator Type ↑ |
|---|---|---|---|---|
| Performance | ↓ | ↓ | N/A | N/A |
| Price | ↑ | ↑ | ↑ | ↑ |

As illustrated in Table 1, various dependencies are available to adjust the FaaS market-driven pricing across all users. Pricing could be determined as a function of multiple parameters. For example, as acceleration of execution is increased from elastic to meta-elastic, performance may decrease while price increases. As QOS is adjusted from commodity, to medium level, to a high guarantee level, the performance may decrease while the price increases. In a preferred distribution and an increased capacity for accelerator type increases, so does the price.

Using the dependencies illustrated in Table 1, an illustrative pricing table is also provided in Table 2. The pricing may correspond with an estimated number of FaaS invocations using a distribution method described herein. The pricing scheme may correspond with different levels of service, different types of tail-latency, and different accelerator types. Each row corresponds with a different accelerator type to perform the invocations (e.g., small, medium, and large accelerator types).

TABLE 2

Pricing for 1000 FaaS invocation, where pricing is listed as: using a default distribution (using a preferred distribution)

| Accelerator type | For each QoS, the percentage is tail-latency for: execution/elastic/meta-elastic | | |
|---|---|---|---|
| | Commodity 20%/30%/35% | Medium 15%/22.5%/25% | High Guarantee 10%/15%/20% |
| Small | $0.10 ($0.15) | $0.15 ($0.23) | $0.20 ($0.30) |
| Medium | $0.15 ($0.23) | $0.20 ($0.30) | $0.30 ($0.45) |
| Large | $0.20 ($0.30) | $0.30 ($0.45) | $0.40 ($0.60) |

One example of the pricing is provided with Table 2. The pricing may be determined as a function of QoS tail-latency (ramp-up), elastic tail-latency (speed of ramp-up), and meta-elastic tail latency (acceleration of ramp-up), as well as type of distribution (preferred or random). When a small accelerator type is used with the FaaS infrastructure, the cost to the user may correspond with $0.10 for random distribution among warm copies and $0.15 for preferred distribution. The price increases to $0.15 for random distribution among warm copies and $0.23 for preferred distribution. The price continues to increase to $0.20 for random distribution among warm copies and $0.30 for preferred distribution. When a medium accelerator type is used with the FaaS infrastructure, the cost to the user may correspond with $0.15 for random distribution among warm copies and $0.23 for preferred distribution. The price increases to $0.20 for random distribution among warm copies and $0.30 for preferred distribution. The price continues to increase to $0.30 for random distribution among warm copies and $0.45 for preferred distribution. When a large accelerator type is used with the FaaS infrastructure, the cost to the user may correspond with $0.20 for random distribution among warm copies and $0.30 for preferred distribution. The price increases to $0.30 for random distribution among warm copies and $0.45 for preferred distribution. The price continues to increase to $0.40 for random distribution among warm copies and $0.60 for preferred distribution. These illustrative values are for explanation purposes only and should not be used to limit the scope of the disclosure.

The FaaS market-driven pricing may be based on various factors. These factors may include quality of service (QOS) delivered on tail latency for reserved resources, a ramp-up time period required for non-reserved resources, and/or a speed of the ramp-up. The speed of the ramp-up may be based on acceleration of elasticity or meta-elasticity for flash crowds. In some examples, the pricing may correspond with a default option (e.g., a consolidation to optimize cost) or a preferred distribution option (e.g., co-location, strides). In some examples, the pricing may correspond with an accelerator type and/or corresponding memory-size of a computing device. In some examples, cost for accessing the FaaS infrastructure may be dynamic, in part, to quickly increase a number of warm copies of a deployed FaaS on a plurality of accelerators.

The type of the accelerators used to execute the function from the request may be determined based on processing power or throughput relative to other sizes and types of accelerators. Other factors may be analyzed to determine the type of accelerator without diverting from the essence of the disclosure.

In some examples, all invocations may be counted in addition to the measured QoS value (e.g., as tail latency, ramp-up tail latency, and accelerated ramp-up tail latency). The QoS value may be compared with a threshold value and an alert may be generated when the threshold value is not met. For example, if the alert on missing QOS is raised on the execution, ramp-up, or acceleration of ramp-up, then the system may dynamically generate the alert and initiate a switch of the processing to a faster accelerator. The system may also generate a list of the cached copies that are adjusted at the corresponding scheduler(s) and/or dispatcher.

Returning to FIG. 3, optimized dispatching can be achieved by a queue being more aggressively maintained on global dispatcher 210, regional schedulers 230, and local schedulers 240. For example, a request can be sent to the next accelerator (e.g., second resource 250B of resource infrastructure pools 250) via local scheduler 240B of local schedulers 240 with the available warm instance for the FaaS identifier. The request may include the warm instance and FaaS identifier. This implementation may use additional electronic communications and share additional information with second resource 250B directly from the schedulers rather than originating the request with global dispatcher 210.

In some implementations, optimized dispatching can be achieved by implementing one or more global queues to store one or more requests for resources. The global queues may be implemented where requests are submitted (e.g., associated with the API gateway 112 or global dispatcher 110). The requests may be removed from the queues by schedulers (e.g., regional scheduler 230A, global scheduler 220, etc.) which are serving requests.

Profit-driven, prediction-based scheduling, and/or performance-based deployment of FaaS may be implemented. The scheduling and deployment may be a function of user tier and profit, revenue, and/or cost values. For example, customer tiers may be used to predict initial scheduling and to drive subsequent scheduling. A customer tier adjustment may be implemented to adjust assignment of execution of the requests when the QoS (or other metric) corresponding to the submitted requests has exceeded a relative threshold at the resource executing the function, or when the QoS (or other metric) corresponding to the submitted requests has exceeded an absolute threshold for the system. The system may configure an allocation of resources from pools (e.g., associated with cost) corresponding to the tiers (e.g., associated with revenue) to maximize profit.

In some examples, a redeployment of FaaS may be implemented in case of failures or overload. For example, the system may configure a new allocation of resources to execute the functions when a previous allocation of resources has failed or been overloaded.

In one possible implementation, redeployment of FaaS can be achieved by determining revenue or cost values for each type of resource call. As described herein, counters may be incremented when a resource node is accessed and the value of the counter may be used to calculate an aggregate profit value corresponding to the access (e.g., using a corresponding cost of using the resource node to perform the processing, etc.).

In some embodiments, the system may perform a prediction of resource usage or scheduling, which may determine a baseline execution time of a function and predict the associated resource requirements. In other embodiments, a footprint for memory may be assessed. With these baseline measurements determined, the system can perform new or subsequent executions of functions. In case of a new execution (e.g., first time scheduling), the prediction may be based on typical class of FaaS and adjusted as more information is collected. Upon each subsequent execution, the system may determine whether to upgrade or downgrade the resources available for execution (e.g., based on a profit window, baseline, or other factors). The choice of resource adjustments may consist of: a) resource types (unless paid for specific type, the type can be adjusted based on availability and profit made); b) location of subsequent or current executions; c) class of resources (managed differently than other classes); d) amount of consolidation (running alone vs crowded node); and e) upgrade for free to higher tier in case QoS cannot be met; etc.

In some examples, the resource may experience a failure or overload (e.g., too many resource calls to complete prior to exceeding a threshold value, etc.). This may trigger an adjustment of reserved warm cached instances. The adjustment may be based on the type, class, or distribution of the resource and/or a consideration of profit associated with the user or tier (e.g., adjusting the reserved warm cached instances from a first user of tier type 1 to a second user of tier type 2).

In some examples, a user may become associated with a different tier (e.g., calculated based on absolute revenue earned, or relative revenue compared to all other customers, etc.). This may trigger an adjustment to the allocated resources available to the user. In some examples, future schedules of functions from the user may be executed based on the type, class, or distribution of the adjusted tier for the user, rather than the tier associated with the request.

In another possible implementation, profit-driven, prediction-based scheduling, and/or performance-based deployment of FaaS can be achieved by approximating a cost and price by averaging a cost of the resources (e.g., based on type, class of accelerator, memory sizes, etc.). An overall average revenue for a customer for this FaaS may also be determined. The system may apply a periodic sweep of adjustments to one or more instances of a warm cached FaaS to execute on higher or lower classes of resources. In some examples, if profit is increased beyond expected, the benefits may be split in terms of reduced cost and/or increased QoS for user (e.g., a fraction of profit can be returned to reduce the cost or improve the QoS for customers, by moving some of the FaaS to higher grade accelerators, etc.).

Figure 5:
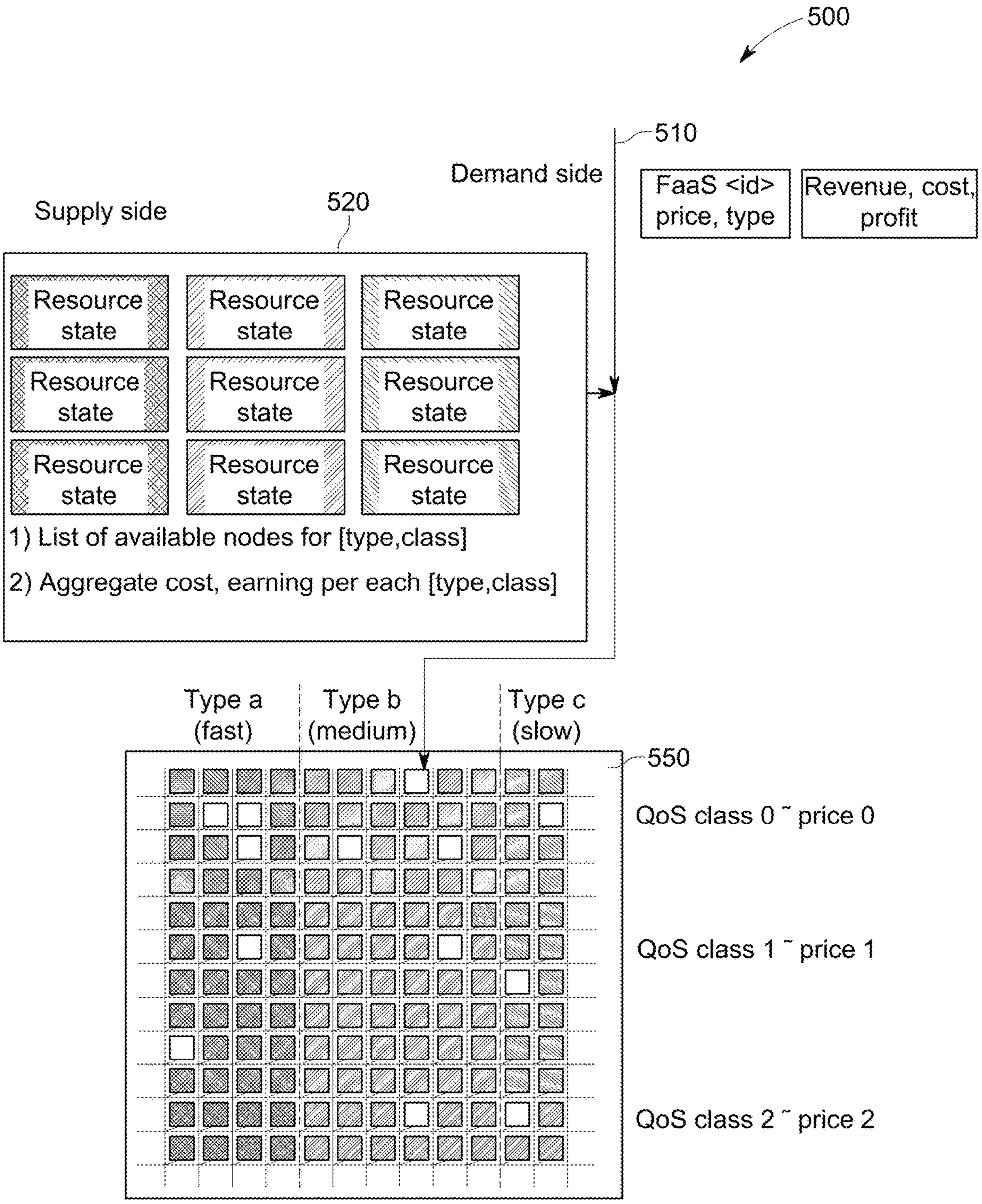
FIG. 5 provides an illustrative example of demand side and supply side scheduling, in accordance with embodiments of the application.

FIG. 5 provides an illustrative example of demand side and supply side scheduling, in accordance with embodiments of the application. In illustration 500, demand device 510 (e.g., global dispatcher 110) and supply device 520 (e.g., global scheduler 120, regional scheduler 130, local scheduler 140) may access resource infrastructure pool 550 (e.g., resource infrastructure pool 150). The correlations between devices illustrated in FIG. 5 and devices illustrated in FIG. 1 are provided as examples only and should not limit the scope of the description provided herein.

Demand device 510 may enumerate various characteristics of a resource infrastructure in a request. Characteristics may include an FaaS identifier, price, type, revenue, cost, profit, QoS, and/or preference. In some examples, QoS, and/or preference may be derived from the price or other values provided by demand device 510.

In some examples, each invocation of a resource used to support a request submitted by demand device 510 is tracked by incrementing a first counter. The first counter may be incremented each time a resource is invoked. The first counter may identify a number of invocations of the resource node. A second counter may be implemented in some examples for other purposes (e.g., to account for revenue generated, etc.). One or more counters may be implemented in various embodiments of the application.

Supply device 520 may generate a list of available resource nodes (e.g., accelerators, processors, etc.). The list of available resource nodes may be determined prior to receiving a request from demand device 510 or in response to receiving the request. Supply device 520 may determine a state of a plurality of resources in the resource infrastructure pool 550. In some examples, each resource node included in the list of available resource nodes may be attributed with one or more parameters. For example, use of the resource node may correspond with a cost or time that the accelerator was executing a process on behalf of an FaaS.

Resource infrastructure pool 550 (e.g., each box corresponding with a different resource node) may correspond with the resource nodes included in the list of available resource nodes. Each resource node may be defined by a type and/or QoS class. The type may correspond with a processing speed of the resource node (e.g., fast, medium, slow, etc.). Once defined by the type, the type may be requested by demand device 510 (e.g., in the FaaS request) and matched with the type included in the list of available resource nodes generated by supply device 520.

Supply device 520 may implement high-level scheduling decisions based on characteristics identified by demand device 510 in the request. For example, supply device 520 may match one or more received characteristics (e.g., multi-criteria lookup) with characteristics of resource nodes in the resource infrastructure pool 550.

The characteristics of each resource node may be ranked or ordered within resource infrastructure pool 550 to improve the matching process. For example, the matching process may first determine whether a type of resource node is available. The matching process may also determine, for example, whether the price is within an acceptable class, whether the information associated with each resource infrastructure pool 550 is cached at one of the four levels of devices (e.g., global dispatcher 110, global scheduler 120, regional scheduler 130, local scheduler 140), or whether the cost can be minimized.

When supply device 520 matches the one or more received characteristics with the characteristics of an available resource node in resource infrastructure pool 550, supply device 520 may allocate the request to the available resource node and exit the search/matching process.

When supply device 520 does not match the received characteristics with the characteristics of available resource nodes in resource infrastructure pool 550, supply device 520 may perform an action based on the characteristic that is unavailable. For example, if the resource type is not available, the resource type may be upgraded to a faster type and the search may be rerun. If the price is not available within an acceptable class, the class may be upgraded and the search may be rerun.

In some examples, the information about the resource nodes (e.g., characteristics, availability, resource type, class, number of warm instances, etc.) is cached at the four levels of devices (e.g., global dispatcher 110, global scheduler 120, regional scheduler 130, local scheduler 140). For example, the first attempt for deployment may be made on global dispatcher 110. If there is no information cached at global dispatcher 110, then the request is forwarded to global scheduler 120. If global scheduler 120 has information, it may transmit the information back to global dispatcher 110. If not, global scheduler 120 may collaborate with regional schedulers 130 which similarly either provide information immediately or they work with local schedulers 140.

If the information associated with each resource infrastructure pool 550 is not cached at one of the four levels of devices, a new request may be submitted to one of the schedulers in the system, including global scheduler 120, regional scheduler 130, or local scheduler 140. If the cost is not minimized, the class or type may be downgraded to a lower class or type, respectively, and a corresponding lower cost and the search may be rerun.

Figure 6:
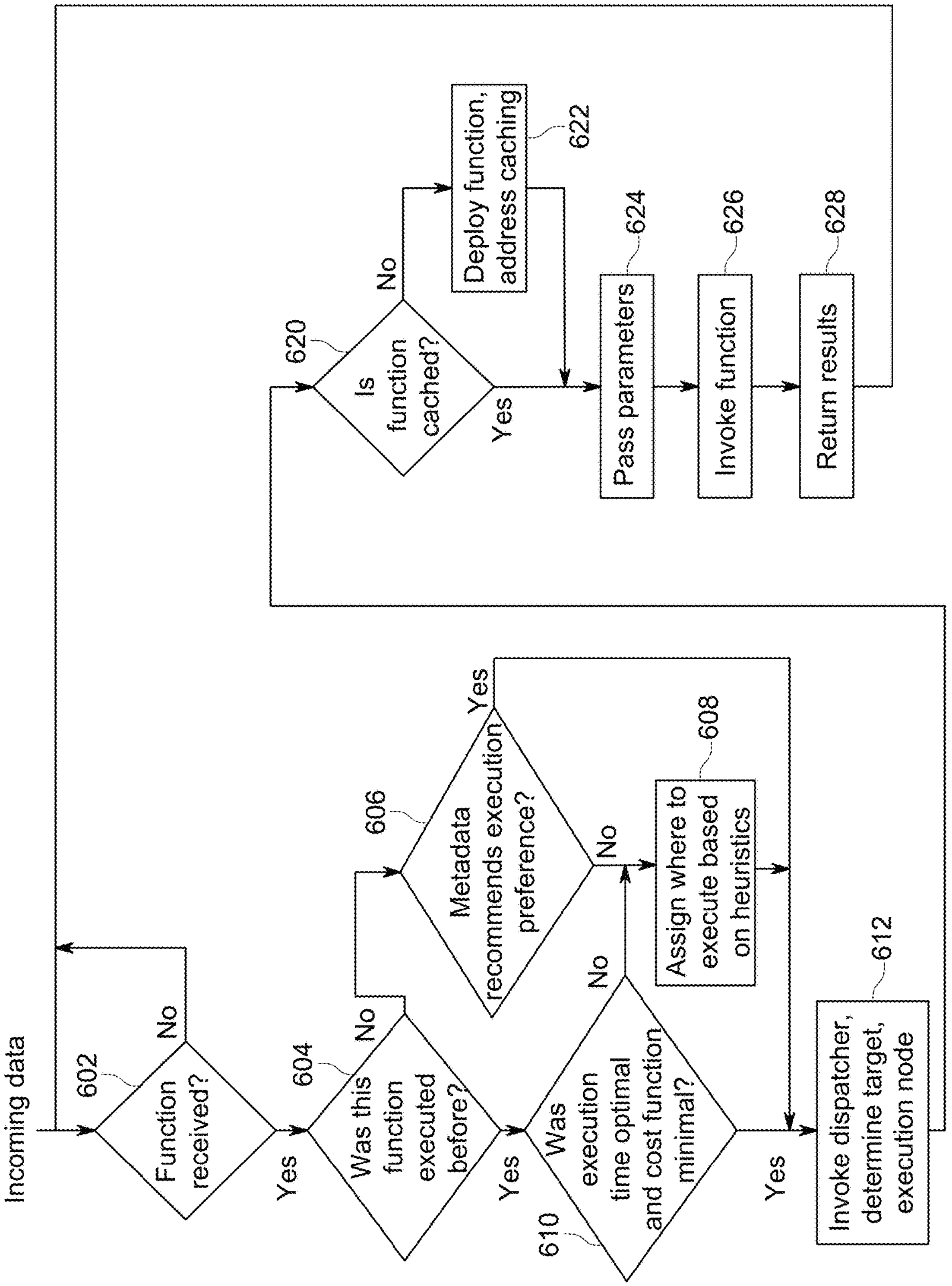
FIG. 6 provides an illustrative process of deploying or invoking an function as a service (FaaS), in accordance with embodiments of the application.

FIG. 6 provides an illustrative process of deploying or invoking an function as a service (FaaS), in accordance with embodiments of the application. The system may receive incoming data from a user in an FaaS system, invoke a function provided by the FaaS system, and return results that correspond with the incoming data to the user. The system executing steps illustrated in FIGS. 6-7 may correspond with the global dispatcher 110, global scheduler 120, regional scheduler 130, local scheduler 140, and resource infrastructure pool 150 of FIG. 1.

At 602, the system may analyze the incoming data to determine whether a function was received. If no, the incoming data may be ignored by this process until new incoming data is received. If yes, the process may proceed to 604.

At 604, the system may determine whether the function included with the incoming data was executed prior to this instance. For example, the system may determine whether there are no more warm copies and, in that case, local scheduler 140 can respond to regional scheduler 130 (unless it is already known at global dispatcher 110). If no, the process may proceed to 606. If yes, the process may proceed to 610.

At 606, the system may analyze metadata of the request to determine whether the metadata corresponds with an execution preference. If no, the process may proceed to 608. If yes, the process may proceed to 612.

At 608, the system may determine a first resource node to initiate a first execution of the function based on heuristics. Heuristics may be based on predetermined preferences while meeting customer QoS. For example, the system can determine whether there is too much traffic to the resource node (e.g., based on a comparison with a threshold value), so the request of a certain type can be reassigned to a different resource node. Resource allocation and trending could be observed for certain types of requests growing in demand, anticipating that it is better not to allocate new request on a resource node and start on a new one, or on one resource node where there is no trending FaaS. Alternatively, the provided heuristics might assign all incoming requests to available resource nodes until each resource node is filled. The process may proceed to 612.

At 610, the system may review the characteristics from the prior executions of functions across one or more resource nodes. For example, the characteristics may include an execution time or cost. These characteristics may be compared with a threshold value to determine whether the execution time was optimal in relation to the threshold or if the cost function was minimal in relation to threshold. If the characteristic exceeds the threshold value (e.g., execution time was optimal, cost function was minimal, etc.), the process may proceed to 612. If no, the process may proceed to 608.

At 612, the system may invoke global dispatcher 110 and determine target execution resource node (e.g., using dispatching algorithms illustrated in FIGS. 2-4). The process may proceed to 620.

At 620, the system may determine if the function is cached. If yes, the process may proceed to 624. If no, the process may proceed to 622.

Figure 7:
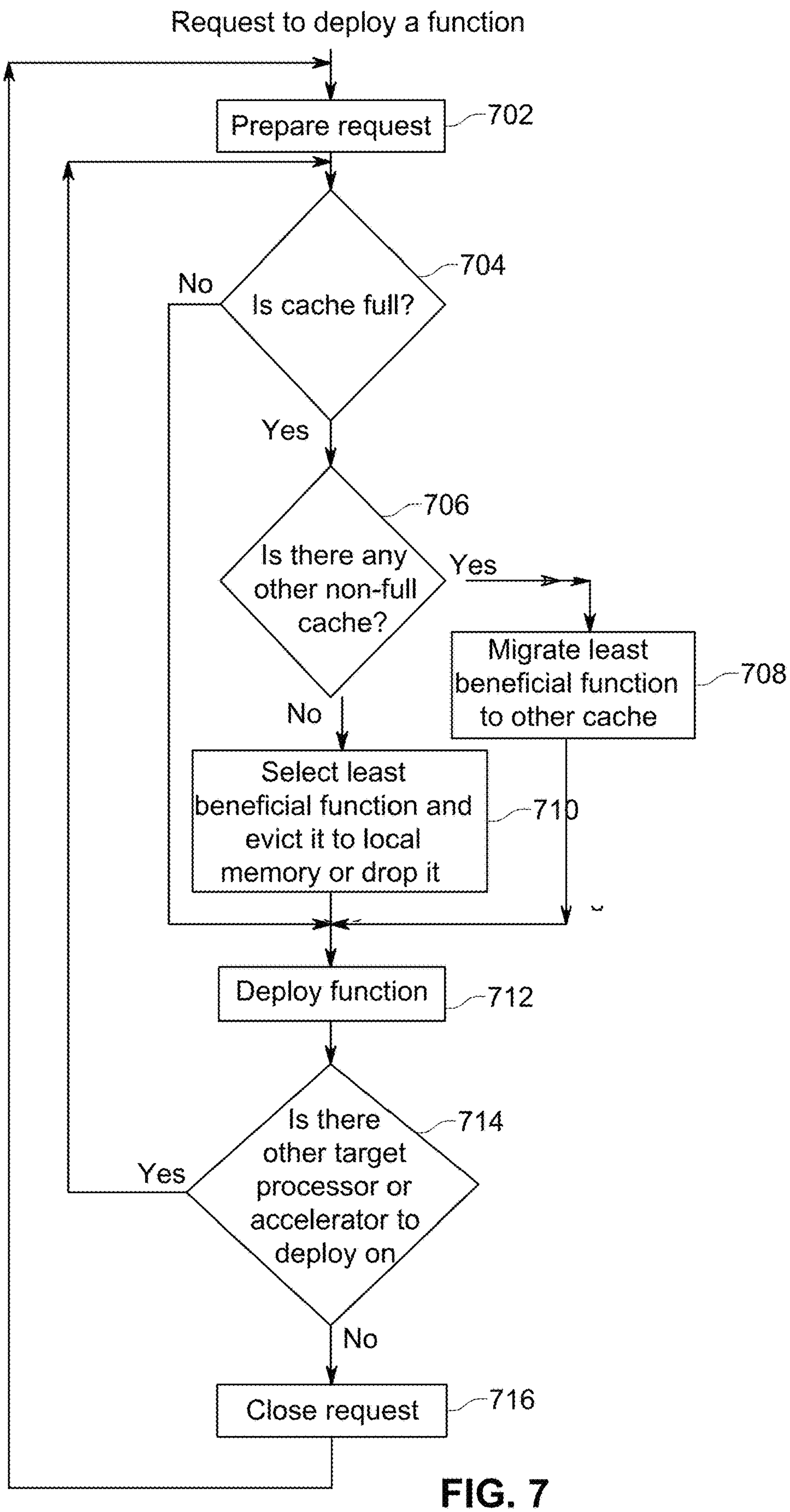
FIG. 7 provides an illustrative process for cash management of the arriving function in the FaaS system, in accordance with embodiments of the application.

At 622, the system may deploy a function and perform address caching. Additional detail associated with deploying a function and performing address caching is illustrated in FIG. 7, which describes the cache management process for the arriving functions.

At 624, the system may pass parameters. As discussed herein, the parameters may include a function code, metadata, or function ID. The code can be specific to one execution platform or it can be generic, so that the function code can be deployed to any of the resource nodes. In some examples, the FaaS infrastructure may translate the code received in the request to a different format that complies with the particular FaaS infrastructure. The process may proceed to 626.

At 626, the system may invoke the function at the resource node. For example, the resource node may execute the code to generate results in response to the received FaaS request. The process may proceed to 628.

At 628, the system may return results. The process may proceed to 602 to address new incoming data.

As illustrated in FIG. 7, functions can be cached on the resource node where they are targeted to execute, or they can be cached in the memory of another resource node or in global memory. The system may manage the caches by rearranging and moving the least beneficial functions stored in the cache to different caches accessible by the system.

The decision of where to cache a function can be made through local scheduler 140 or regional scheduler 130. In some examples, the function can be cached close to where it has been executed. For example, if the function cannot be cached close to where it is executed, then it may be redeployed from the source (e.g., one place where it is deployed first or would even have to be redeployed from the customer after long time has expired, etc.).

Upon eviction of function from the unit where it was executing, upon next invocation, the function's code can be retrieved from another location where it was stored. The system can retrieve a copy of the function's code either from global memory, from slower storage, or from a different storage location. In some examples, the failure can be returned and new deployment request will be executed prior to execution.

At 702, the system may receive a request to deploy a function. For example, an electronic communication may be generated in a predetermined format that includes the FaaS identifier and warm instance of the function to be executed on the resource node. The process may proceed to 704.

At 704, the system may determine if the cache is full. If yes, the process may proceed to 706. If no, the process may proceed to 712.

At 706, the system may initiate a search for a second cache. The second cache may be identified if it is non-full and exists in the FaaS infrastructure. If yes, the process may proceed to 708. If no, the process may proceed to 710.

At 708, the system may migrate the least beneficial function from the first cache to the second cache. The least beneficial function may be determined by its recency of use or number of uses, etc. As described herein, the benefits may be derived at the function type level or at the customer level. For example, the customer may be achieving some profit by running functions, but it also costs to run them. Both profit and cost may be exact values that can be measured by the system. If customer is gaining profit from running certain functions, the customer may be willing to pay a bit more to earn more money. Similarly, if certain functions are not contributing to profit, the functions may unlikely be executed on fastest accelerators, cached on many resource nodes, etc.

At 710, the system may select the least beneficial function and evict to a local memory or drop it. The process may proceed to 712.

At 712, the system may deploy the requested function. The process may proceed to 714.

At 714, the system may determine if there are other target resource nodes (e.g., processors, accelerators, etc.) to deploy the function on. This determination may help the system deploy multiple functions on multiple resource nodes efficiently. When there are no other available resource nodes, the system may move on (e.g., close the request). The target resource nodes may be limited to the FaaS infrastructure. If yes, the process may proceed to 704. If no, the process may proceed to 716.

At 716, the system may close the request to deploy the function.

Figure 8A:
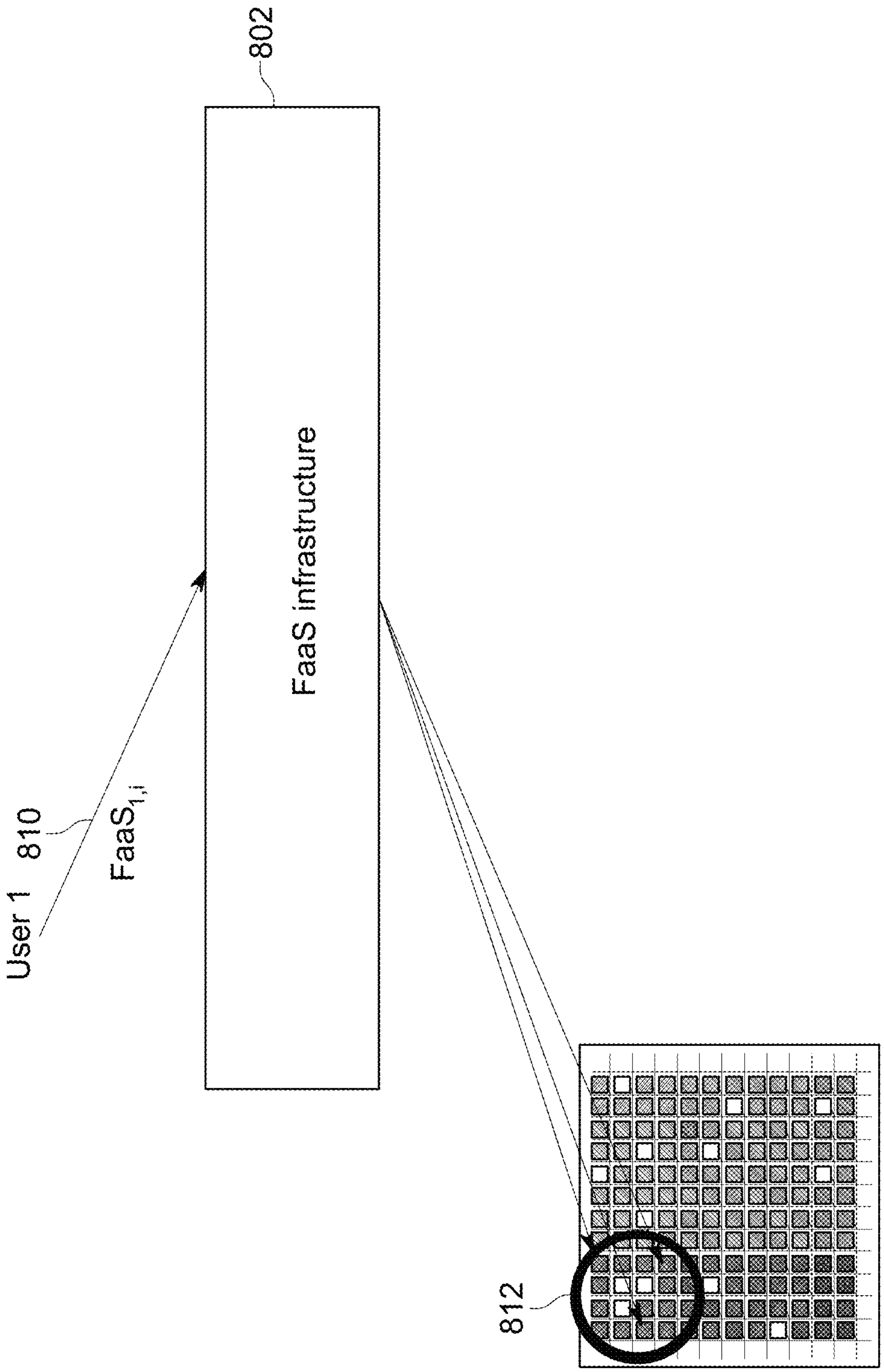
FIGS. 8A-8C provide illustrative examples of types of distribution, in accordance with embodiments of the application.
Figure 8B:
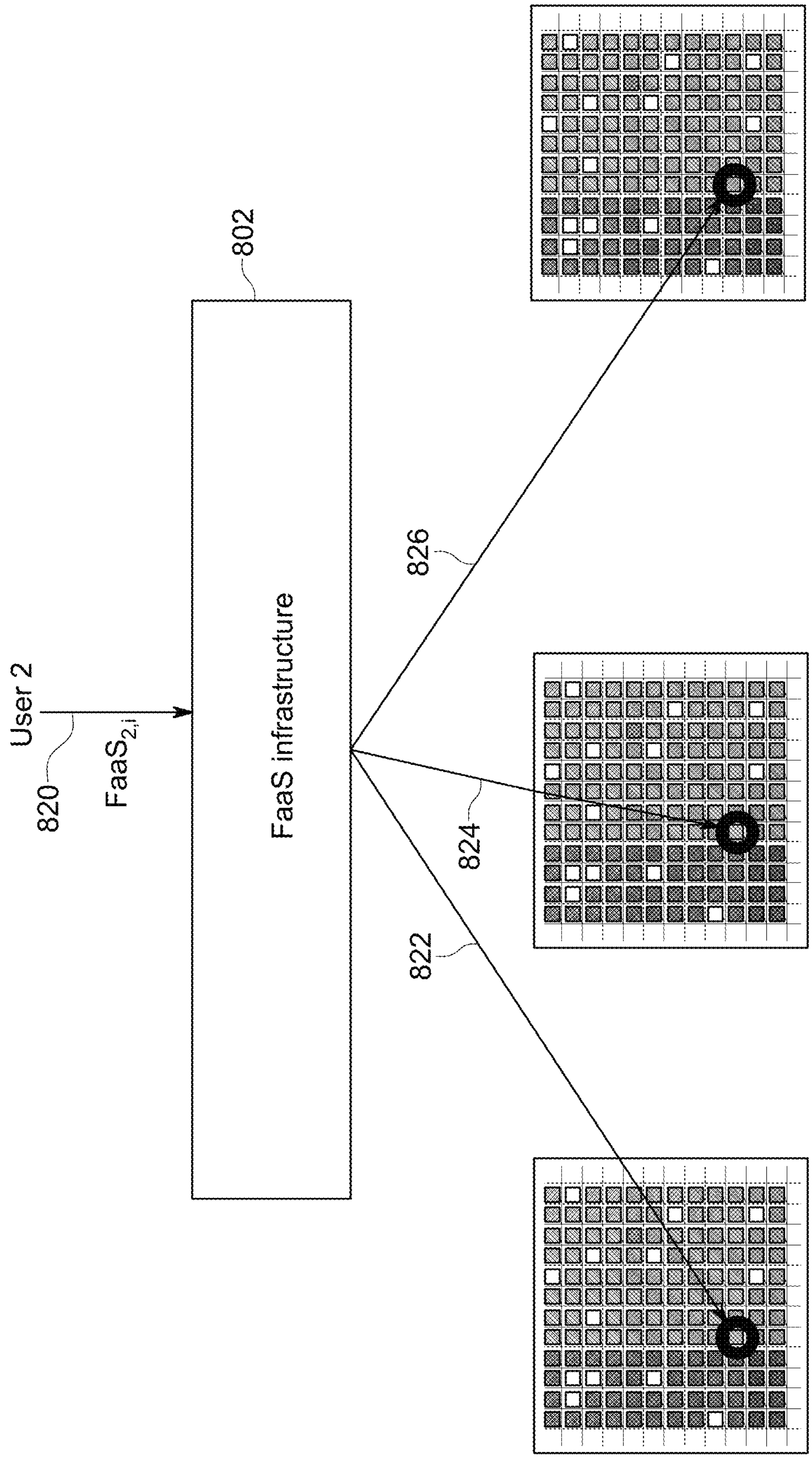
Figure 8C:
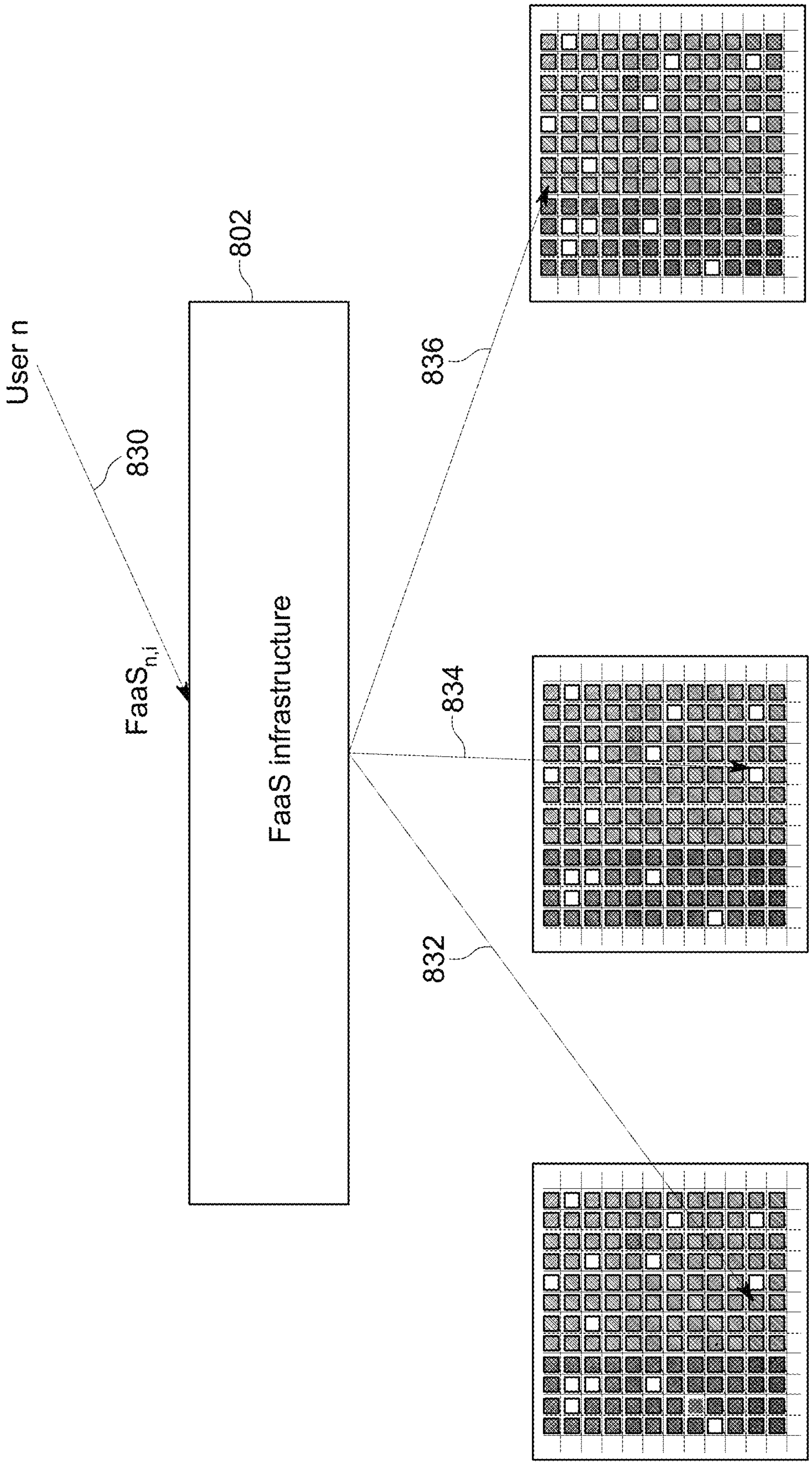

FIGS. 8A-8C provide illustrative examples of types of distribution of FaaS invocations, in accordance with embodiments of the application. For example, distribution types illustrated with FIGS. 8A-8C may correspond with co-located, strided, or random resources, respectively, in a plurality of resource pools, including resource pools 250 illustrated in FIGS. 2-4.

The distribution types may benefit different entities. For example, certain types of collaborative functions may be desirable to co-locate the invocation of FaaS processing at the same resource node (e.g., to utilize resources that are physically close together, etc.). For some functions that are heavily consuming of resources (e.g., memory, processing, or networking, etc.), it may be beneficial to deploy the functions in a strided manner. Randomly distributed functions, in some examples, may either incur higher performance costs running remotely (e.g., with co-located) or compete for the same resources (e.g., with stride). In comparison, a provider may consolidate applications (e.g., fully utilize a resource node and then fully utilize a next resource node to keep consolidating other resource nodes), which may appear as a "random" allocation from the customer perspective.

In FIG. 8A, user 1 may submit a first function as a service (FaaS) request 810 to FaaS infrastructure 802, including the methods, systems, and computer readable media described herein. FaaS infrastructure 802 may process the first FaaS request 810 and identify a co-located group 812 of accelerators, processors, or other devices to associate with user 1. This co-located group 812 may process the first FaaS request 810 and provide output back to user 1 via FaaS infrastructure 802.

In FIG. 8B, user 2 may submit a second FaaS request 820 to FaaS infrastructure 802, including the methods, systems, and computer readable media described herein. FaaS infrastructure 802 may process the second FaaS request 820 and identify a stride group 822, 824, and 826 of accelerators, processors, or other devices to associate with user 2 (e.g., based on a proportional-share control over accelerator time by cross-applying elements of rate-based flow control algorithms). This stride group 822, 824, and 826 may process the second FaaS request 820 and provide output back to user 2 via FaaS infrastructure 802.

In FIG. 8C, user 3 may submit a third FaaS request 830 to FaaS infrastructure 802, including the methods, systems, and computer readable media described herein. FaaS infrastructure 802 may process the third FaaS request 830 and identify a random group 832, 834, and 836 of accelerators, processors, or other devices to associate with user 3. This random group 832, 834, and 836 may process the third FaaS request 830 and provide output back to user 3 via FaaS infrastructure 802.

Figure 9:
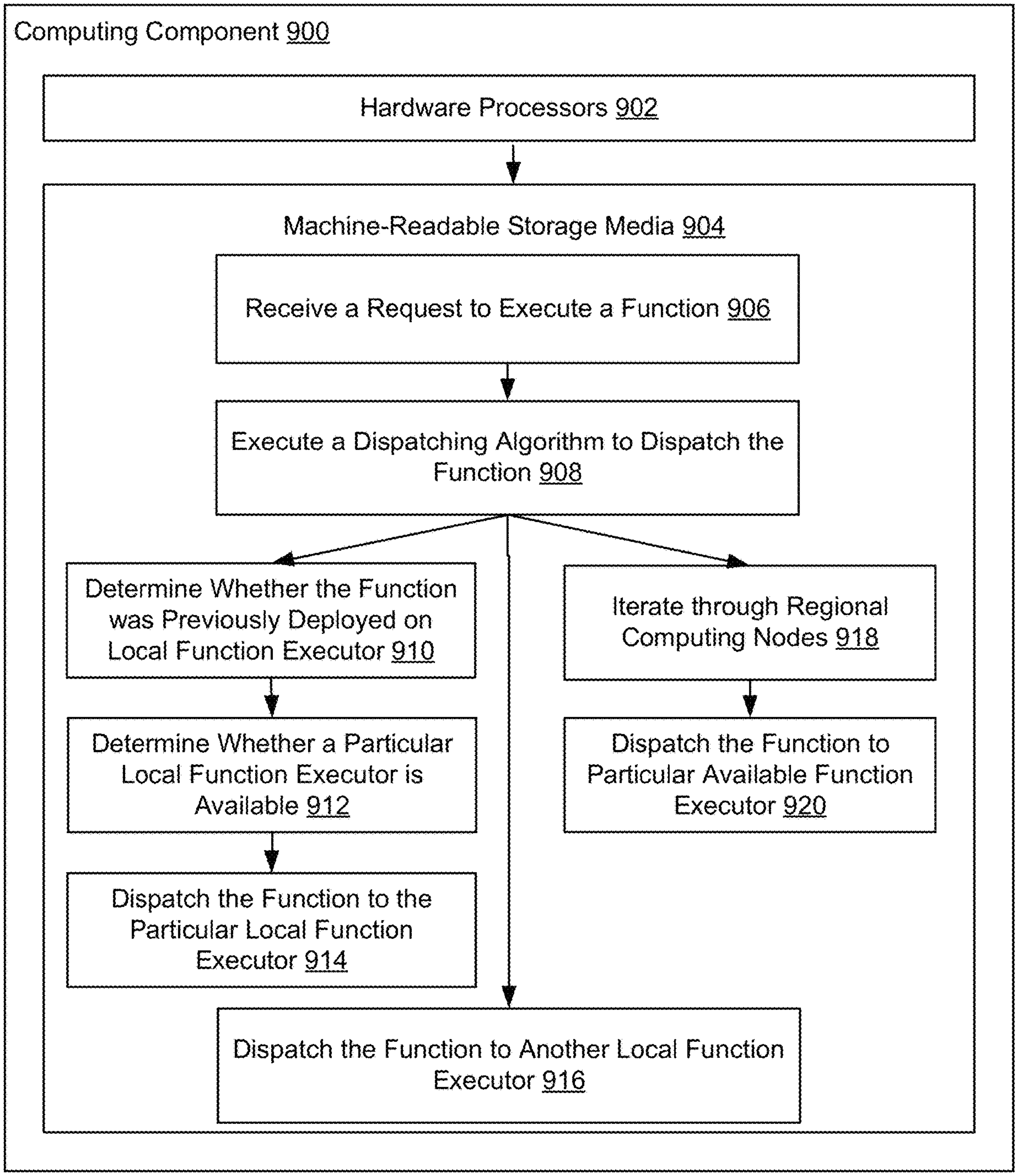
FIG. 9 illustrates a computing component for providing dispatching of FaaS in heterogeneous accelerator environments, in accordance with embodiments of the application.

FIG. 9 illustrates an exemplary iterative process performed by a computing component 900 for providing optimized dispatching of an FaaS in a heterogeneous accelerator environment. Computing component 900 may be, for example, a server computer, a controller, or any other similar computing component capable of processing data. In the example implementation of FIG. 9, the computing component 900 includes a hardware processor 902, and machine-readable storage medium 904. In some embodiments, computing component 900 may be an embodiment of a system corresponding to global dispatcher 110 of FIG. 1.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 906-614, to control processes or operations for optimizing the system during run-time. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-920.

Hardware processor 902 may execute instruction 906 to receive a request to execute a function. The request may include a function identifier of the function.

Hardware processor 902 may execute instruction 908 to execute a dispatching algorithm to dispatch the function. In some examples, executing a dispatch algorithm to dispatch the function may use a minimal number hops. For example, the minimal number of hops may correspond with a number of intermediate connections in a string of connections that link the global dispatcher, scheduler, and/or resource, or that link two resources when processing is moved from one resource to another. Executing the dispatching algorithm includes executing instructions 910-918.

Hardware processor 902 may execute instruction 910 to determine, based at least in part on the function identifier, whether the function was previously deployed on one or more local function executors associated with a local computing node.

Hardware processor 902 may execute instruction 912 to, responsive to determining that the function was previously deployed on the one or more local function executors, determine whether a particular local function executor is available. In some examples, the process may determine whether a particular local function executor associated with an oldest previous deployment of the function is available. In other examples, the process may determine whether a particular local function executor associated with any available warm copy of the function is available.

Responsive to determining that the particular local function executor is available, hardware processor 902 may execute instruction 914 to dispatch the function for invocation and execution by the particular local function executor (e.g., CPUs, GPUs, FPGAS and ASIC accelerators, etc.).

Responsive to determining that the particular local function executor is not available, hardware processor 902 may execute instruction 916 to dispatch the function to another local function executor.

Responsive to determining that the function was not previously deployed on the one or more local function executors, hardware processor 902 may execute instruction 918 to iterate through one or more regional computing nodes.

Responsive to iterating through the one or more regional computing nodes, hardware processor 902 may execute instruction 920 to identify a particular available function executor to which to dispatch the function.

In some examples, the one or more local function executors associated with the local computing node may be an accelerator that incorporates a machine learning process.

In some examples, executing the function may use a minimal number of hops. The minimal number of hops corresponds with a shortest path between infrastructure resources including the local function executor.

In some examples, executing the function may use a minimal number of hops corresponding with a minimum latency between infrastructure resources including the local function executor.

In some examples, hardware processor 902 may execute an instruction to identify that the one or more local function executors associated with the local computing node is overloaded and initiate a fault process in response to identifying that the one or more local function executors associated with the local computing node is overloaded.

In some examples, hardware processor 902 may execute an instruction to identify a cache miss and initiate a fault process in response to identifying the cache miss.

In some examples, hardware processor 902 may execute an instruction to store information associated with the function in a key-value store (KVS) and search the KVS for available local function executors associated with the local computing node.

Figure 10:
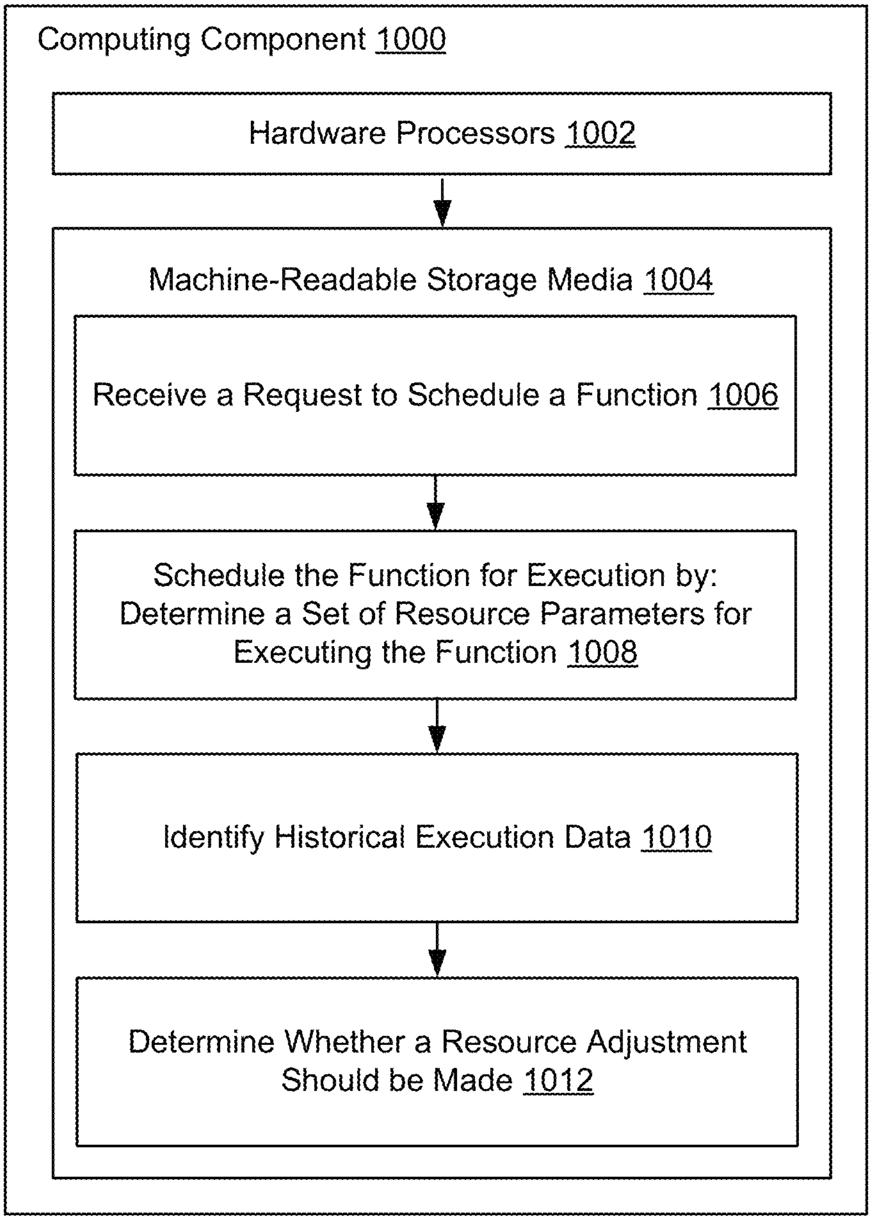
FIG. 10 illustrates a computing component for providing scheduling of FaaS in heterogeneous accelerator environments, in accordance with embodiments of the application.

FIG. 10 illustrates an example iterative process performed by a computing component 1000 for providing optimized scheduling of an FaaS in a heterogeneous accelerator environment. Computing component 1000 may be, for example, a server computer, a controller, or any other similar computing component capable of processing data. In the example implementation of FIG. 10, the computing component 1000 includes a hardware processor 1002, and machine-readable storage medium 1004. In some embodiments, computing component 1000 may be an embodiment of a system corresponding global scheduler 120, regional scheduler 130, and/or local scheduler 140 of FIG. 1.

Hardware processor 1002 may be one or more central processing units (CPUs), semiconductor-based microprocessors, and/or other hardware devices suitable for retrieval and execution of instructions stored in machine-readable storage medium 1004. Hardware processor 1002 may fetch, decode, and execute instructions, such as instructions 1006-1012, to control processes or operations for optimizing the system during run-time. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1004, may be any electronic, magnetic, optical, or other physical storage device that contains or stores executable instructions. Thus, machine-readable storage medium 1004 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1004 may be a non-transitory storage medium, where the term "non-transitory" does not encompass transitory propagating signals. As described in detail below, machine-readable storage medium 1004 may be encoded with executable instructions, for example, instructions 1006-1012.

Hardware processor 1002 may execute instruction 1006 to receive a request to schedule a function for execution. The request may include a function identifier of the function.

Hardware processor 1002 may execute instruction 1008 to schedule the function for execution, wherein the scheduling comprises determining a set of resource parameters for executing the function. The set of resource parameters may comprise at least a resource type and a resource class.

Hardware processor 1002 may execute instruction 1010 to identify historical execution data indicative of one or more execution performance metrics associated with prior executions of the function.

Hardware processor 1002 may execute instruction 1012 to determine whether a resource adjustment should be made to the set of resource parameters based at least in part on the historical execution data.

Figure 11:
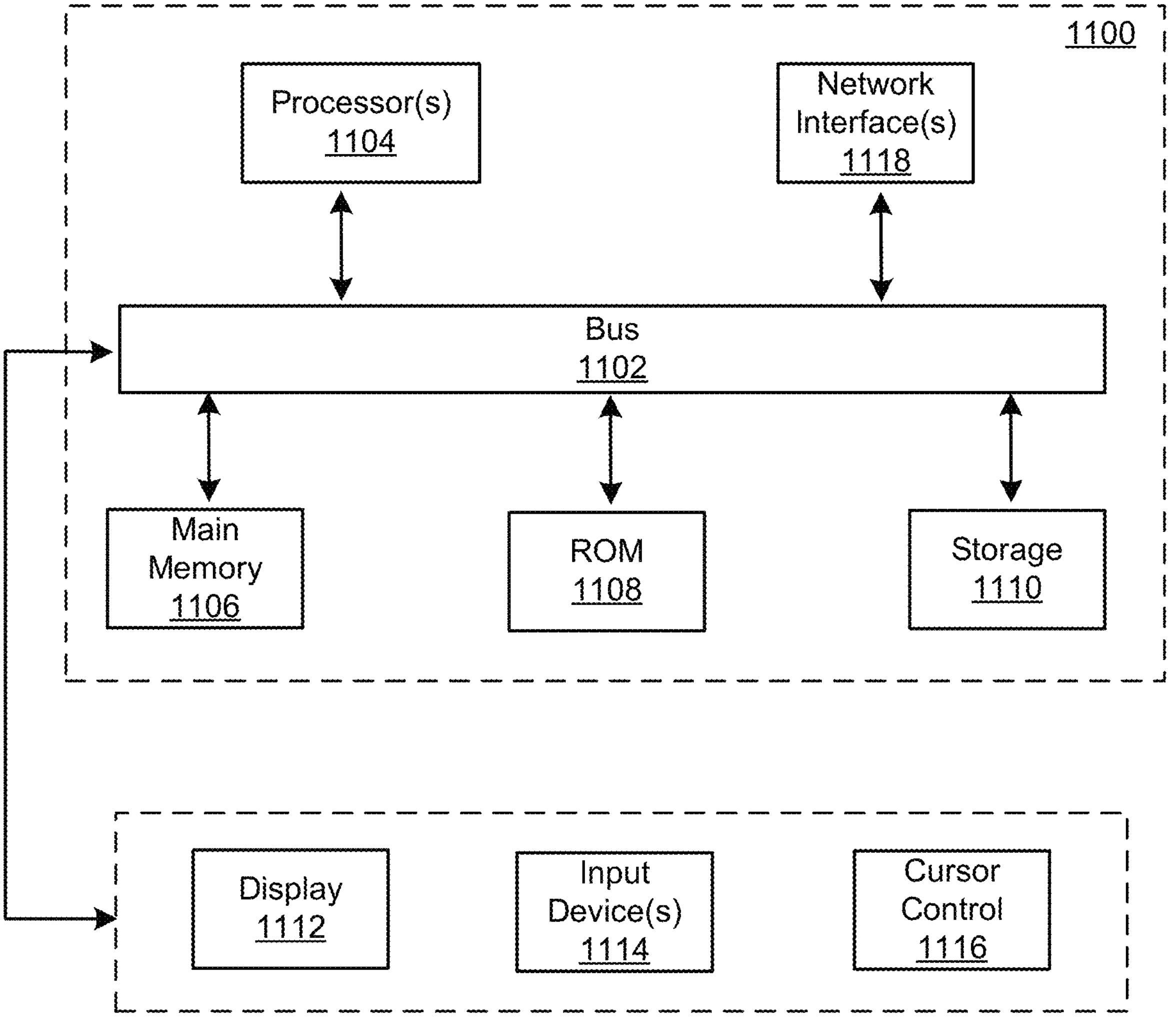
FIG. 11 is an example computing component that may be used to implement various features of embodiments described in the present disclosure.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for function dispatching in a function-as-a-service (FaaS) computing environment, the method comprising:

receiving a request to execute a function, the request comprising a function identifier of the function;

determining, based on the function identifier, whether a first local function executor on which the function was previously deployed is available;

responsive to determining that the first local function executor is available, dispatching the function for invocation and execution by the first local function executor;

measuring a Quality of Service (QoS) value associated with the execution of the function by the first local function executor; and switching the execution of the function to a second local function executor faster than the first local function executor in response to determining that the QoS value is lower than a threshold value.

2. The computer-implemented method of claim 1, wherein the first local function executor is an accelerator and is among one or more local function executors associated with a local computing node, wherein the function was previously deployed on one or more local function executors.

3. The computer-implemented method of claim 2, further comprising executing a dispatching algorithm to dispatch the function using a minimal number of hops to determine the first local function executor.

4. The computer-implemented method of claim 3, wherein the minimal number of hops corresponds with a shortest path between infrastructure resources including the first local function executor.

5. The computer-implemented method of claim 3, wherein the minimal number of hops corresponds with a minimum latency between infrastructure resources including the first local function executor.

6. The computer-implemented method of claim 2, further comprising:

identifying that one or more local function executors associated with the local computing node are overloaded; and initiating a fault process in response to identifying that the one or more local function executors associated with the local computing node are overloaded.

7. The computer-implemented method of claim 1, further comprising:

determining that no local function executor is available in a first queue dedicated to the function identifier; and adding one or more new warm copies of local function executors to the first queue in response to determining that no function executor is available in the first queue.

8. The computer-implemented method of claim 1, wherein the QoS value comprises one or more of tail latency, ramp-up tail latency, or accelerated ramp-up tail latency.

9. The computer-implemented method of claim 1, wherein determining whether the first local function executor is available comprises identifying that a warmed copy of the function is available.

10. The computer-implemented method of claim 1, wherein determining whether the first local function executor is available comprises identifying that an oldest previous deployment of the function is available.

11. The computer-implemented method of claim 1, further comprising:

checking a cache of the first local function executor for the function;

identifying a cache miss; and initiating a fault process in response to identifying the cache miss.

12. A non-transitory computer-readable storage medium storing a plurality of instructions executable by one or more processors, the plurality of instructions when executed by the one or more processors causes the one or more processors to:

receive a request to execute a function, the request comprising a function identifier of the function;

determine, based at least on a customer tier associated with the function, whether a first local function executor on which the function was previously deployed is available; and responsive to determining that the first local function executor is available, dispatching the function for invocation and execution by the first local function executor.

13. The non-transitory computer-readable storage medium of claim 12, wherein the plurality of instructions when executed by the one or more processors causes the one or more processors to:

measure a Quality of Service (QoS) value associated with the execution of the function via the first local function executor; and reschedule the execution of the function on a second local function executor based on the QoS value.

14. The non-transitory computer-readable storage medium of claim 13, wherein the plurality of instructions when executed by the one or more processors causes the one or more processors to adjust the customer tier responsive to determining that the QoS value corresponding to the request has exceeded a relative threshold at the first local function executor executing the function.

15. The non-transitory computer-readable storage medium of claim 13, wherein the plurality of instructions when executed by the one or more processors causes the one or more processors to adjust the customer tier responsive to determining that the QoS value corresponding to the request has exceeded an absolute threshold.

16. The non-transitory computer-readable storage medium of claim 12, wherein the plurality of instructions when executed by the one or more processors causes the one or more processors to allocate resources from pools corresponding to the customer tier to maximize profit.

17. A function-as-a-service (FaaS) computing system, comprising:

a dispatcher device configured to:

receive a request to execute a function, the request comprising a function identifier of the function; and determine whether a first local function executor on which the function was previously deployed is available; and responsive to determining that the first local function executor is available, dispatching the function for invocation and execution by the first local function executor; and a scheduler device configured to:

measure a Quality of Service (QoS) value based on a tail latency associated with the execution of the function via the first local function executor; and determine a market-driven price of the execution by the first local function executor based on costs to deliver the QoS value, distribution and an accelerator-type associated with the first local function executor.

18. The FaaS computing system of claim 17, wherein the scheduler device is configured to determine the tail latency as a lesser of a first tail latency associated with a default execution, a second tail latency associated with an elastic execution, and a third tail latency associated with a meta-elastic execution.

19. The FaaS computing system of claim 17, wherein the QoS value is based on one or more of a second tail latency for reserved resources, a ramp-up time period required for non-reserved resources, or a speed of the ramp-up, and wherein the speed of the ramp-up is based on an acceleration of elasticity or meta-elasticity for flash crowds.

20. The FaaS computing system of claim 17, wherein the scheduler device is configured to determine the market-driven price based on a memory size of hosting the first local function executor.

* * * * *